United States Patent [19]
Wilson et al.

[11] Patent Number: 5,220,522
[45] Date of Patent: * Jun. 15, 1993

[54] PERIPHERAL DATA ACQUISITION, MONITOR, AND CONTROL DEVICE FOR A PERSONAL COMPUTER

[75] Inventors: Dennis A. Wilson, Wauconda Township, Lake County; Mark S. Williamsen, Harwood Heights, both of Ill.

[73] Assignee: Ansan Industries, Ltd., Rockford, Ill.; a part interest

[*] Notice: The portion of the term of this patent subsequent to Mar. 24, 2009 has been disclaimed.

[21] Appl. No.: 832,716

[22] Filed: Feb. 7, 1992

Related U.S. Application Data

[63] Continuation of Ser. No. 350,115, May 9, 1989, Pat. No. 5,099,444.

[51] Int. Cl.⁵ .............................................. G06F 3/00
[52] U.S. Cl. ................................................ 364/709.09
[58] Field of Search ................. 364/709.11; 395/500; 340/706

[56] References Cited

U.S. PATENT DOCUMENTS

| | | | |
|---|---|---|---|
| 3,654,449 | 4/1972 | Boyce | 364/709.11 |
| 3,955,073 | 5/1976 | Carew et al. | 364/561 |
| 3,961,168 | 6/1976 | Gaffney | 235/152 |
| 4,084,249 | 4/1978 | Schlock | 364/709.01 |
| 4,101,883 | 7/1978 | Hempenius et al. | 341/22 |
| 4,151,596 | 4/1979 | Howells | 364/709.11 |
| 4,181,959 | 1/1980 | Tateishi | 364/709.11 |
| 4,181,960 | 1/1980 | Tateishi et al. | 364/709.11 |
| 4,195,348 | 3/1980 | Kakutani | 364/709.11 |
| 4,201,908 | 5/1980 | Johnson et al. | 377/9 |
| 4,213,035 | 7/1980 | Washizuka et al. | 364/709.12 |
| 4,250,554 | 2/1981 | Blum et al. | 364/560 |
| 4,370,727 | 1/1983 | Bellet | 364/709.13 |
| 4,379,336 | 4/1983 | Yamamoto et al. | 364/708 |
| 4,480,312 | 10/1984 | Wingate | 364/557 |
| 4,621,334 | 11/1986 | Garcia | 364/550 |
| 4,641,262 | 2/1987 | Bryan et al. | 364/900 |
| 4,669,053 | 5/1987 | Krenz | 364/708 |
| 4,695,833 | 9/1987 | Ogura et al. | 340/722 |
| 4,947,367 | 8/1990 | Chang et al. | 395/500 |
| 5,065,360 | 11/1991 | Kelly | 395/800 |
| 5,099,444 | 3/1992 | Wilson et al. | 364/709.09 |

(List continued on next page.)

FOREIGN PATENT DOCUMENTS 2125996 3/1984 United Kingdom ............ 364/709.11

OTHER PUBLICATIONS

Ernst, "Remotely Control a Pocket Calculator with a Simple CMOS Interface Circuit", *Electronic Design*, vol. 23, pp. 74-75, Nov. 8, 1976.

IBM Corp., "Keyboard Port Attachment", *IBM Technical Disclosure Bulletin*, vol. 28, No. 8, pp. 3358-3359, Jan. 1986.

Apple Computer, Inc., "The Macintosh Family Hardware Reference", *Apple Technical Publications*, APDA Draft, Mar. 2, 1987, pp. 1, 25-29, 93-103, & 171-181.

"The Apple Desktop Bus", reprinted from *Mini-Micro Systems*, Nov. 1987, Part IV, 2 pgs.

Birse, C., "Space Aliens Ate My Mouse (ADB—The Untold Story)", *Macintosh Technical Note #206*, Feb. 1990, pp. 1-8.

Apple Computer, Inc., *Inside Macintosh*, 1988, vol. III, pp. 29-32; vol. IV, p. 250; & vol. V, pp. 361-373.

*Primary Examiner*—Long T. Nguyen
*Attorney, Agent, or Firm*—Welsh & Katz, Ltd.

[57] ABSTRACT

A peripheral data acquisition, monitor, and control device is disclosed which utilizes an Input/Output (I/O) Bridge device for interfacing signals from electronically-controlled peripheral devices to a personal computer (PC) via the keyboard port, thus permitting data, such as measurement data, to be automatically and directly entered into application programs such that the PC can take action and control outputs based upon the measurement data. The I/O Bridge device automatically inputs information into the host computer without having to manually type the information on the keyboard, and also interfaces with the host computer in order to monitor and control various real-world tasks, such as manufacturing functions.

38 Claims, 25 Drawing Sheets

U.S. PATENT DOCUMENTS

| | | | |
|---|---|---|---|
| 4,704,604 | 11/1987 | Fuhs | 364/708 |
| 4,710,869 | 12/1987 | Enokizono | 395/500 |
| 4,755,808 | 7/1988 | Bullock et al. | 340/709 |
| 4,779,079 | 10/1988 | Hauck | 340/706 |
| 4,782,448 | 11/1988 | Milstein | 364/709.11 |
| 4,821,221 | 4/1989 | Kaneko | 364/710.13 |
| 4,829,472 | 5/1989 | McCourt et al. | 364/900 |
| 4,831,568 | 5/1989 | Ito | 364/709.01 |
| 4,852,031 | 7/1989 | Brasington | 364/578 |
| 4,852,032 | 7/1989 | Matsuda et al. | 364/708 |
| 4,882,684 | 11/1989 | Ishigami et al. | 364/708 |
| 4,885,580 | 12/1989 | Noto et al. | 364/709.01 |
| 4,908,612 | 3/1990 | Bromley et al. | 340/706 |
| 4,920,481 | 4/1990 | Binkley et al. | 395/500 |
| 4,935,875 | 6/1990 | Shah et al. | 364/709.01 |
| 4,945,473 | 7/1990 | Holtey et al. | 395/500 |

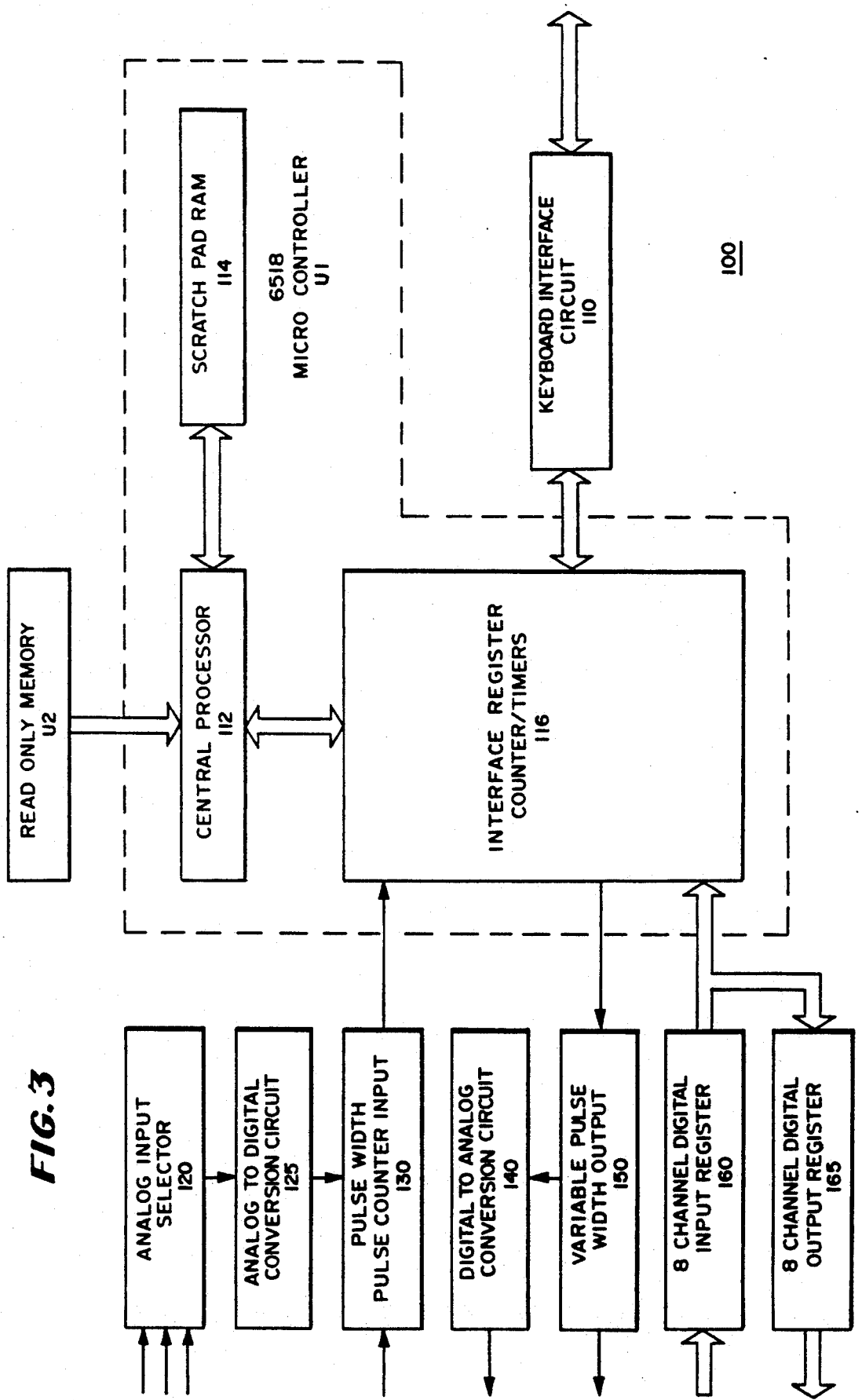

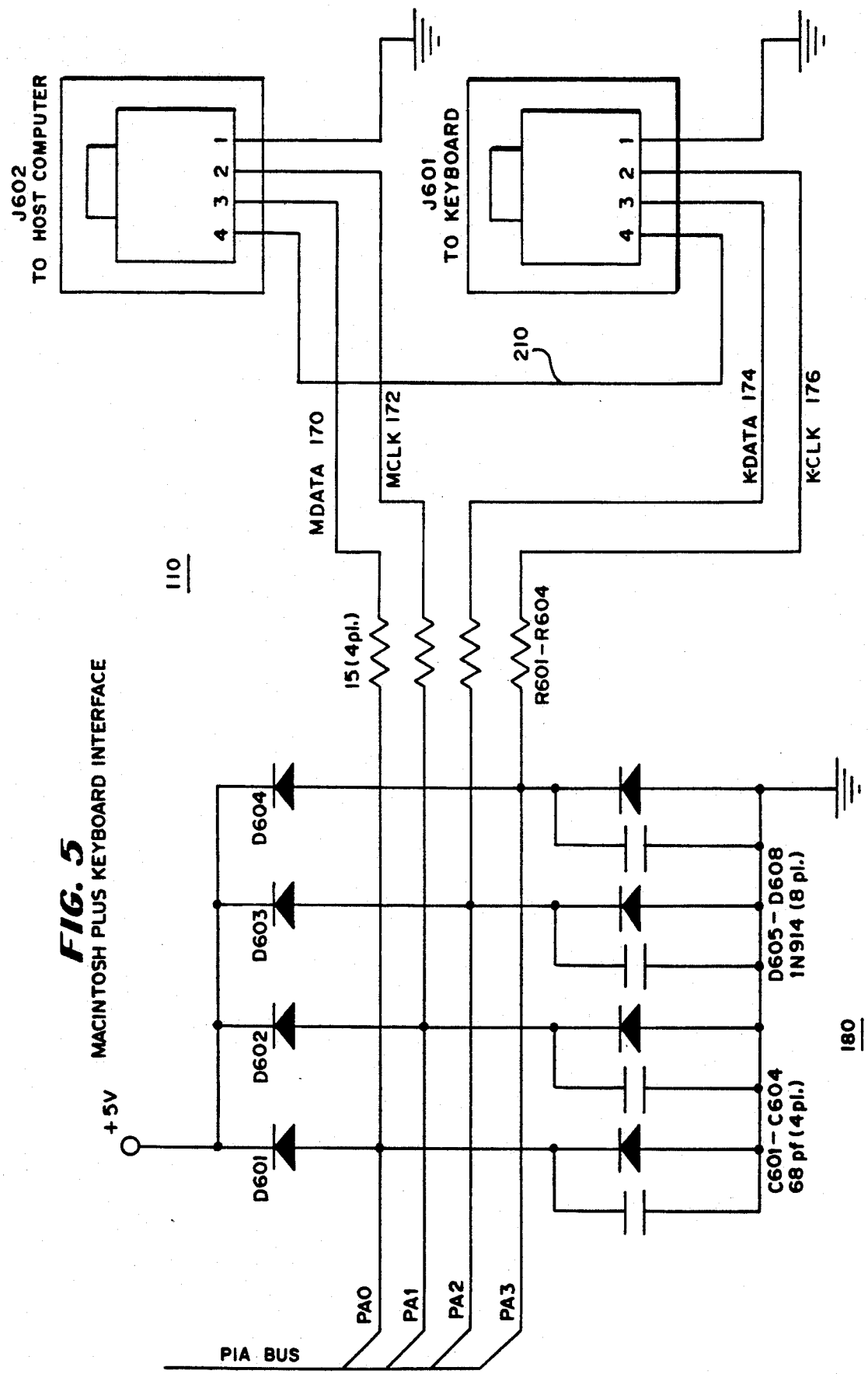
FIG. 5 MACINTOSH PLUS KEYBOARD INTERFACE

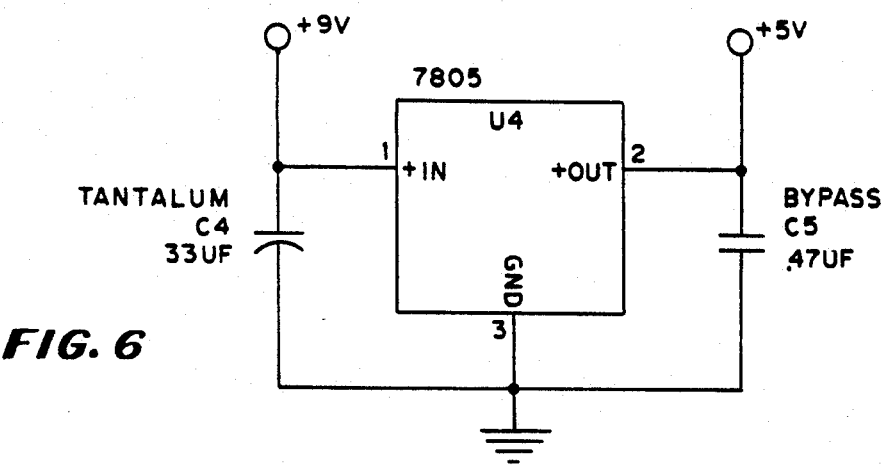
FIG. 6
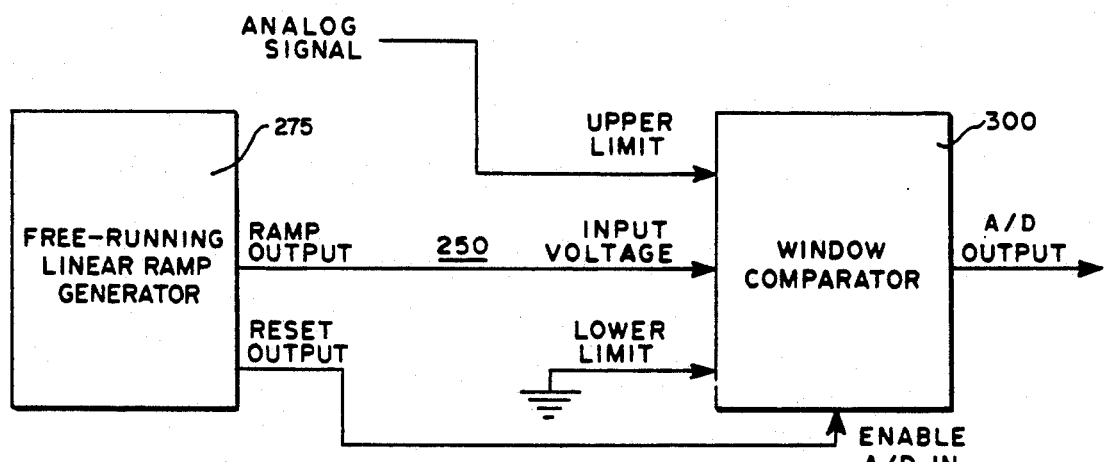
FIG. 7
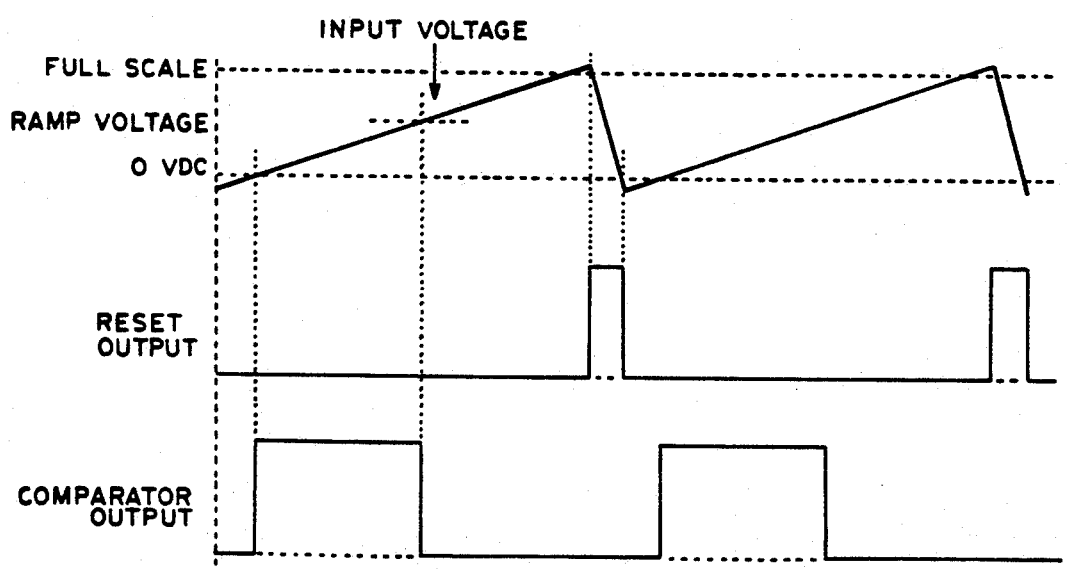
FIG. 8  SINGLE SLOPE ANALOG TO PULSE WIDTH CONVERTER TIMING DIAGRAM

DESK TOP BUS INTERFACE

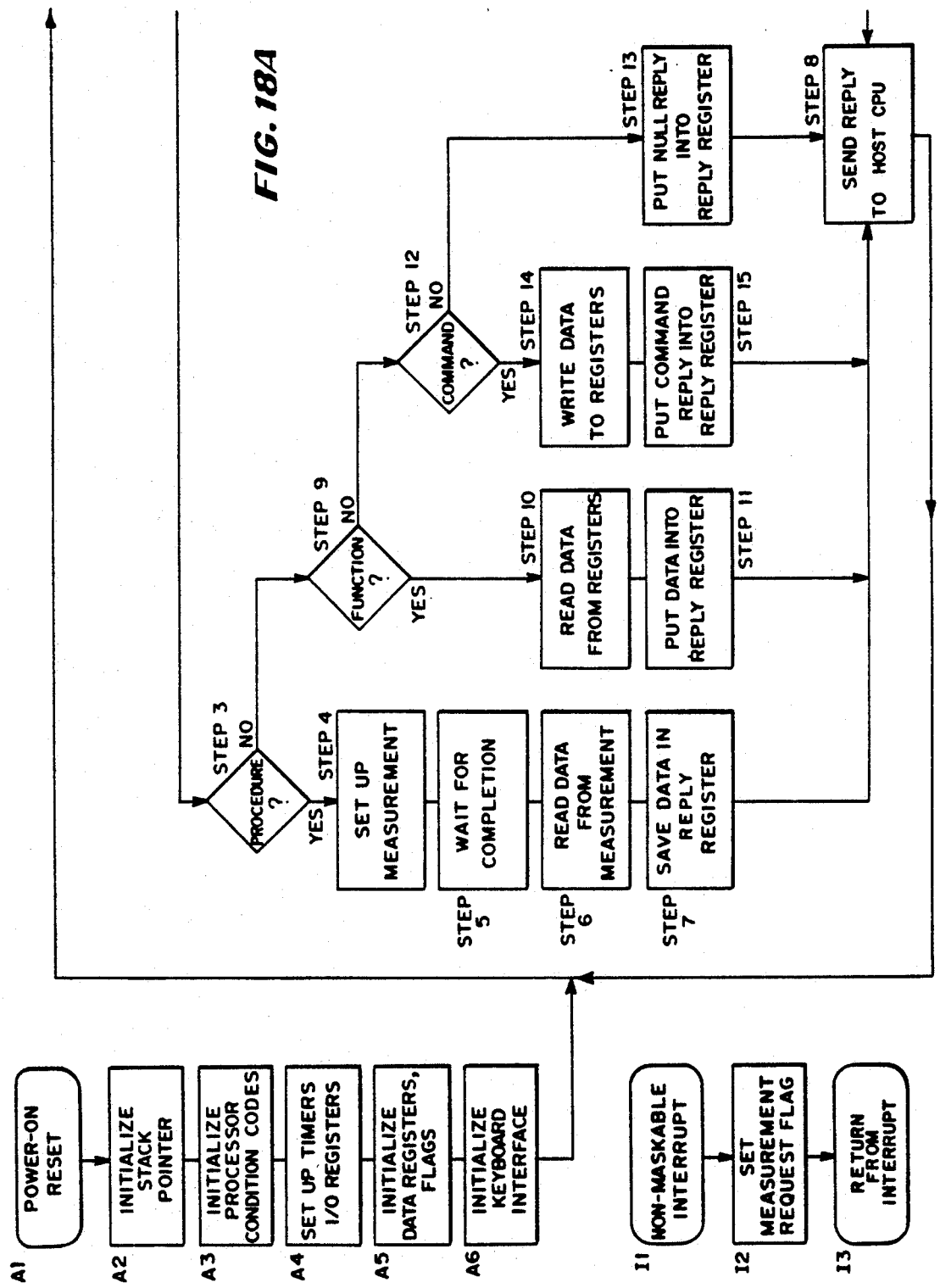

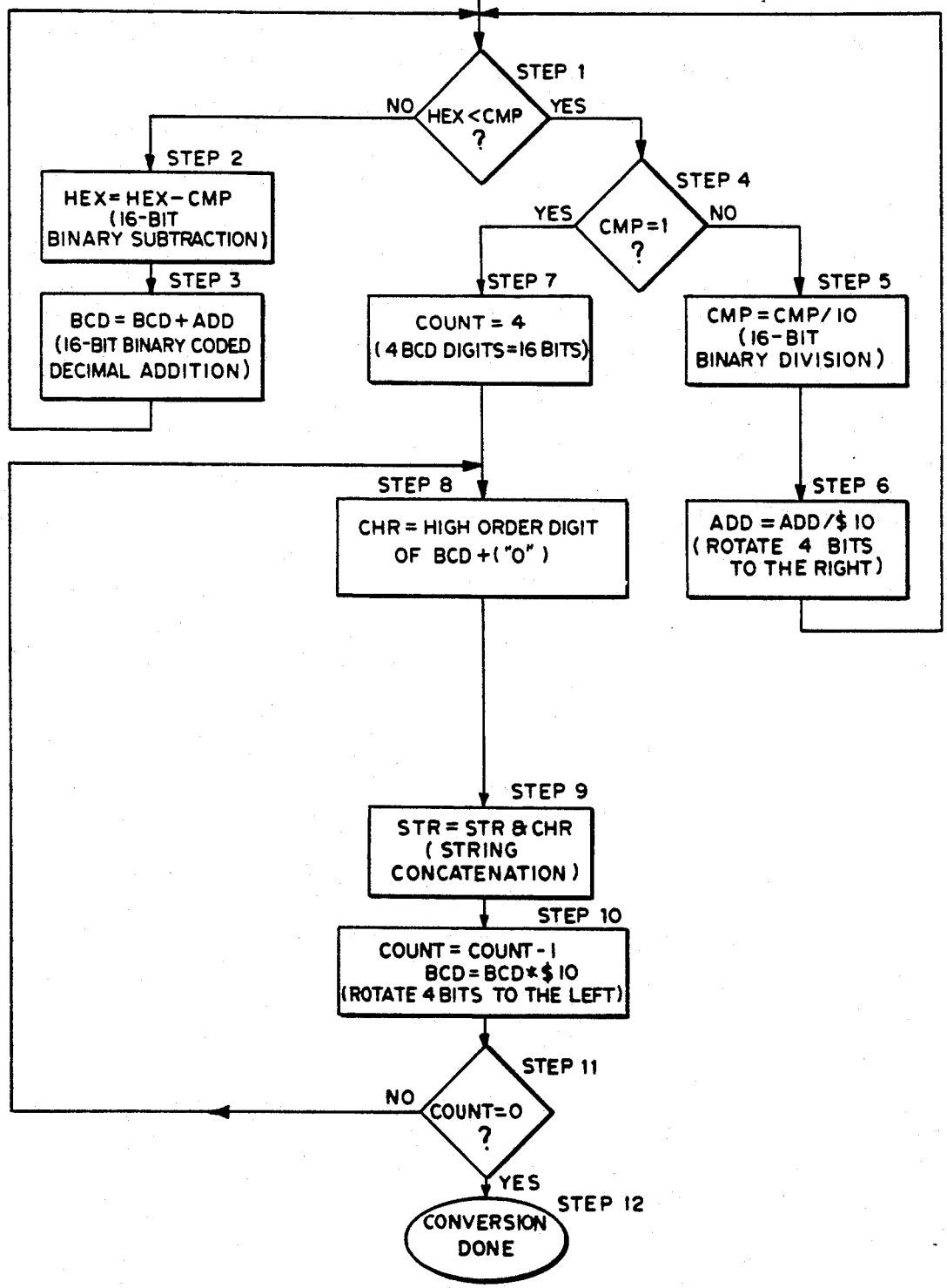

FIG. 20

| I/O BRIDGE REAR PANEL DB-25 PINOUTS | |
|---|---|
| DB-25 PIN | FUNCTION |
| 1 | CHASSIS GROUND |
| 2 | SERIAL XMIT |
| 3 | SERIAL REC |
| 4 | PA7 |
| 5 | A/D INHIBIT (GROUND IT) |
| 6 | +9 VDC (FILTERED) |
| 7 | DIGITAL GROUND |
| 8 | PA5 (PWM OUTPUT) |
| 9 | PA4 (TACHOMETER INPUT) |
| 10 | OUT 1 |
| 11 | OUT 2 |
| 12 | OUT 3 |
| 13 | OUT 4 |
| 14 | OUT 5 |
| 15 | OUT 6 |
| 16 | OUT 7 |
| 17 | OUT 8 |
| 18 | IN 1 |
| 19 | IN 2 |
| 20 | IN 3 |
| 21 | IN 4 |
| 22 | IN 5 |
| 23 | IN 6 |
| 24 | IN 7 |
| 25 | IN 8 |

REPETITION RATE TO
PULSE WIDTH CIRCUIT

EVENT COUNTER
INPUT CONDITIONER

DIGITAL INTERFACE MULTIPLEXER

DIGITAL INTERFACE MULTIPLEXER

REPETITION RATE TO PULSE WIDTH TIMING

PERIPHERAL DATA ACQUISITION, MONITOR, AND CONTROL DEVICE FOR A PERSONAL COMPUTER

CROSS-REFERENCE TO RELATED APPLICATIONS

This application is a continuation of application Ser. No. 07/350,115, filed May 5, 1989, now U.S. Pat. No. 5,099,444, and the benefit of this earlier filing date is hereby claimed under 35 U.S.C. §120.

BACKGROUND OF THE INVENTION

The present invention relates to a peripheral data acquisition, monitor, and control device for use with a personal computer (PC) having a detachable keyboard, the output from the device emulating, in every respect, the signals transmitted to the computer during the operation of inputting values via the keyboard. More specifically, the peripheral data acquisition, monitor, and control device comprises an Input/Output (I/O) Bridge device including programmable circuitry which allows data supplied thereto and fed therethrough, such as measurement data, to be entered directly into programs designed for keyboard entry only, with no keyboard entry being made, and with no reprogramming of the computer, to which the data is being fed, being necessary.

Heretofore, it has been proposed to provide computer controlled data acquisition systems which are designed to automate every step in a particular process. An example of such an automated process would be a production sorting system where products are tested under computer control to see if the products are within limits for certain parameters; and if they are not, they are rejected by the computer. Such a system tends to be expensive, bulky, and of limited utility outside of the narrow use for which it was designed.

There has also been a trend to develop data acquisition accessories for use with desktop computers, which have become very popular. Such accessories (either proposed or developed) consist of plug-in circuit cards which are connectable to the computer's central processing unit (CPU) and are dependent upon the computer as a power source therefor. Special programs must be written to set up the circuit card to take a particular measurement and forward it to the CPU so the measurement either can be saved on a disc storage unit or displayed on a video monitor. While such method reduces the tedium associated with reading and recording measured values and the possibility of errors in such reading and recording, it still has a drawback—that of requiring specialized knowledge and the ability to program the CPU and the data acquisition circuit card in order to perform the desired functions. A further difficulty is encountered in that existing software programs for performing data reduction and analysis based on keyboard entry of data must be modified, or even rewritten, in order to accept input from the data acquisition circuit card.

With the advent of computers having a detachable keyboard including its own microcontroller, and with the keyboard being connected to the CPU by a single cable incorporating a power supply line, a ground line for the keyboard, and a bidirectional data line therefor, it has become possible to develop a device which is connectable between the keyboard and the CPU which can emulate keystrokes for inputting data.

As will be described in greater detail below, the Input/Output Bridge device of the present invention provides a means for acquisition of measurement data and transference of such data to a central processing unit in a manner which, in every respect, emulates the operation of typing in values via a keyboard. In other words, the present invention allows measurement data being input thereto to be modified therein, as required, and then output therefrom, directly into programs designed for keyboard entry only in a manner which completely emulates such keyboard entry, without the need of keyboard entry of such data and without the need of modifying or rewriting existing programs to accept such input.

SUMMARY OF THE INVENTION

The peripheral data acquisition, monitor, and control device (also called Input/Output (I/O) Bridge device) of the present invention simulates the signals produced by the keyboard of a tabulating or computing machine (or a terminal of such a machine) in such a manner that, when the device is connected to the keyboard circuit of the machine, the machine responds exactly as if keys were actually being typed upon. The I/O Bridge device generates signals corresponding to specific items of data so that the data can be entered into the machine.

The I/O Bridge device can readily be used to automate data entry procedures where a human operator takes hundreds or thousands of measurements, records them, and then types them on a keyboard of a personal computer for further reduction and analysis. The I/O Bridge device will automatically make the same measurements, then generate keyboard signals identical to those which would have occurred if the human operator had typed in the values. The process can therefore be automated without affecting the computer's hardware, internal software, or other operations.

The preferred embodiment of the peripheral data acquisition, monitor, and control device of the present invention is adapted for use with various models of a MACINTOSH brand personal computer, i.e., the MACINTOSH PLUS and the MACINTOSH II. (MACINTOSH is a trademark of Apple Computer, Inc., of Cupertino, Calif.) However, the invention is not limited to these embodiments, and can be adapted for use with a wide variety of personal computers.

BRIEF DESCRIPTION OF THE DRAWINGS

FIG. 3 is a block diagram showing a single-chip microcontroller of the device and setting forth all internal functions of the device controlled thereby.

FIG. 5 is a schematic diagram of the keyboard bus interface circuitry for a MACINTOSH PLUS computer.

FIG. 6 is a schematic diagram of the 5 volt power supply for the device of FIG. 1.

FIG. 7 is a block diagram of a single-slope analog-to-pulse-width converter of the I/O Bridge device.

FIG. 8 is a timing diagram for the single-slope analog-to-pulse-width converter of FIG. 7.

FIGS. 18A-18B set forth a program flow diagram of the steps carried out by the microcontroller of the device during a complete cycle of processing information received when the information is to be converted and transmitted to a host CPU via a MACINTOSH PLUS keyboard bus.

FIG. 19 is a program flow diagram of an 11 algorithm used by the microcontroller to convert a binary integer to a decimal text string which is output to the CPU of a host computer with which the device is coupled.

FIG. 20 is a pinout chart setting forth the external connections available at the DB-25 connector on the rear panel of the device shown in FIG. 2.

DESCRIPTION OF THE PREFERRED EMBODIMENTS

Figure 1:
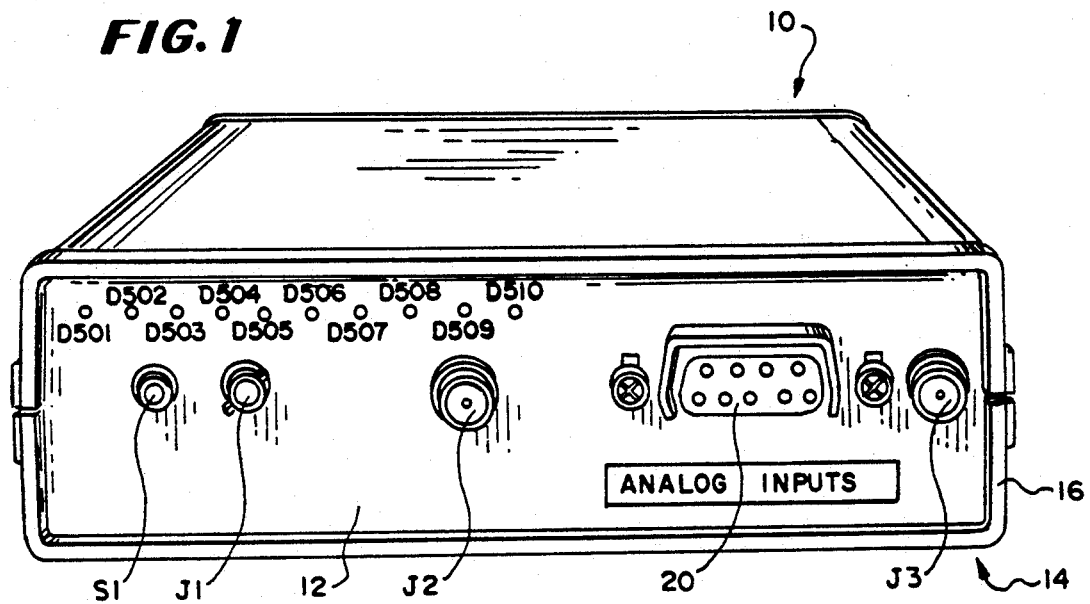
FIG. 1 is a front perspective view of the Input/Output (I/O) Bridge device of the present invention and shows a top panel and a front panel thereof.

Referring now to the drawings in greater detail, FIG. 1 shows the I/O Bridge device 10 of the present invention in a front perspective view, which illustrates the components found on a front panel 12 of the device 10, and illustrates that the housing 14 for the device 10 is in the form of a box 16.

The front panel 12 of the device 10 includes ten light emitting diode (LED) indicator lamps D501-D510 shown extending across the upper left corner of the front panel 12. One of these LEDs, D510, is connected to a power supply through a source resistor (not shown) for the device 10. Eight LEDs, D501-D508, are connected to the digital output lines of the device 10 as will be described below in FIG. 4C. The remaining LED, D509, in the preferred embodiment, is electrically engaged to indicate activity of a front panel switch S1. The push-button switch S1 is shown at the left of the front panel 12. This is the trigger switch S1, which will be described in conjunction with FIG. 4A. The push-button switch S1 is used in this embodiment to set a measurement request flag in a normal mode of operation of the device 10, as will be described below.

The front panel 12 further includes a jack J1 which will accept a one-eighth inch diameter plug therein. This jack J1 will be described in greater detail with reference to FIG. 4A, and it will be seen that the jack J1 is connected in parallel with the front panel trigger switch S1.

A further connector, a 9-pin subminiature D-style connector 20, is connected to the analog input channels of the device 10 as will be described in conjunction with FIG. 4C. The front panel also includes two RCA-type phono jacks J2 and J3. The first jack J2 is connected to an analog input channel of the device 10 (shown as INI in FIG. 4C and FIG. 11). The second jack J3 is connected to an analog output of the device 10 (shown as D/A OUT in FIG. 4B and FIG. 12). The connections to these jacks to the internal circuitry of the device 10 will be described in greater detail in conjunction with the Figures referenced.

Figure 2:
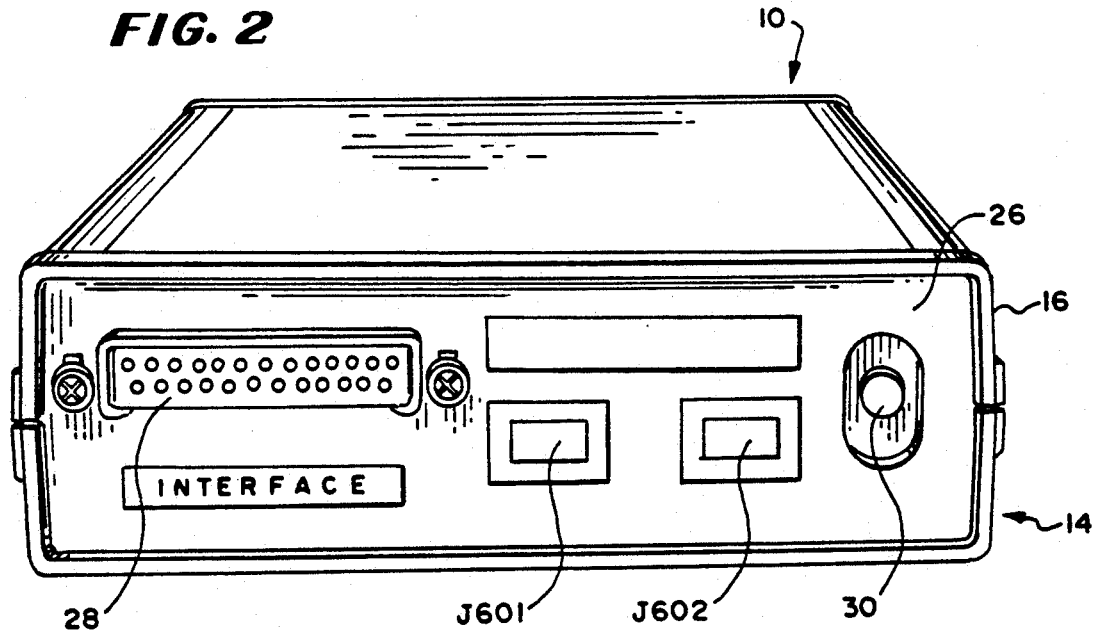
FIG. 2 is a rear perspective view of the I/O Bridge device of the present invention and shows a rear panel and the top panel thereof.

Turning now to FIG. 2, there is illustrated a rear perspective view of the I/O Bridge device 10. A rear panel 26 of the device is seen to include several items The first item is a 25-pin subminiature D-style interface connector 28, which is connected to various digital signal lines present in the I/O Bridge device 10. FIG. 20 sets forth the connections of this DB-25 connector in chart form. Two modular, four-conductor telephone-style jacks, J601 and J602, are also shown on the rear panel 26. The connections to these jacks within the I/O Bridge device 10 will be described in conjunction with FIGS. 4B, 5, and 14. Finally, a power input jack 30 is provided for connection of an external power source to the I/O Bridge device 10. This connection is shown as pins 1 and 3 of U4 in FIGS. 6 and 15, and will be described in greater detail below.

The case or housing 14 of the device 10 is approximately five inches wide, five inches long, and one and one-half inches high, providing a device 10 which is an extremely compact and mobile piece of accessory equipment for use with a personal computer.

FIG. 3 sets forth a general block diagram 100 defining the hardware of the I/O Bridge device 10. As will be seen below, the internal functions of the I/O Bridge device 10 are controlled by a single-chip microcontroller U1, the controller in the preferred embodiment being a Rockwell one-chip microcontroller part number R6518P, hereinafter referred to as a 6518. It is to be understood that, although specific circuit devices are described herein, these devices are not to be considered limiting, inasmuch as other manufacturers offer parts with similar functionalities and similar performances in such applications.

The 6518 microcontroller U1 includes an enhanced instruction set 6502-type central processor 112, a scratch pad random access memory (RAM) 114, a crystal-controlled clock oscillator circuit (not shown), two parallel interface registers 116 having a serial interface shift register, two counter/timers, and a variety of input and output functions. An external read only memory (ROM) integrated circuit U2 is used to store software programs written for the 6518. A keyboard interface circuit 110 connects four of the lines described above in one parallel interface register to connectors suited, in this particular instance, for use with the MACINTOSH PLUS keyboard interface. The remaining circuit blocks described below provide for input and output of both digital and analog signals.

The correlation between FIG. 3 and FIGS. 4A–4D will show the details of the various circuits in the context of the overall design of the device 10. However, continuing with FIG. 3, the first set of bidirectional data lines for U1 interface with the eight-channel digital input register 160 and the eight-channel digital output register 165 for the device 10. These registers 160 and 165 interact with the interface registers 116 to provide input to the registers 116 as well as receiving output from the registers 116.

An output is also provided to a variable pulse-width output circuit 150. The output from the variable pulse-width output circuit 150 may be directed to various peripheral devices, or may first be filtered through a digital-to-analog (D/A) conversion circuit 140 and then output to further devices.

With regard to inputs, an analog input selector 120 is provided which feeds its output to an analog-to-digital (A/D) conversion circuit 125, which feeds a pulse-width measuring input circuit 130. It is to be noted that the pulse-width input circuit 130 may also receive input from peripheral devices connected directly thereto, and all inputs are passed through the pulse counter input circuit 130 prior to entering the counter/timer portion of the interface registers 116.

Figure 15:
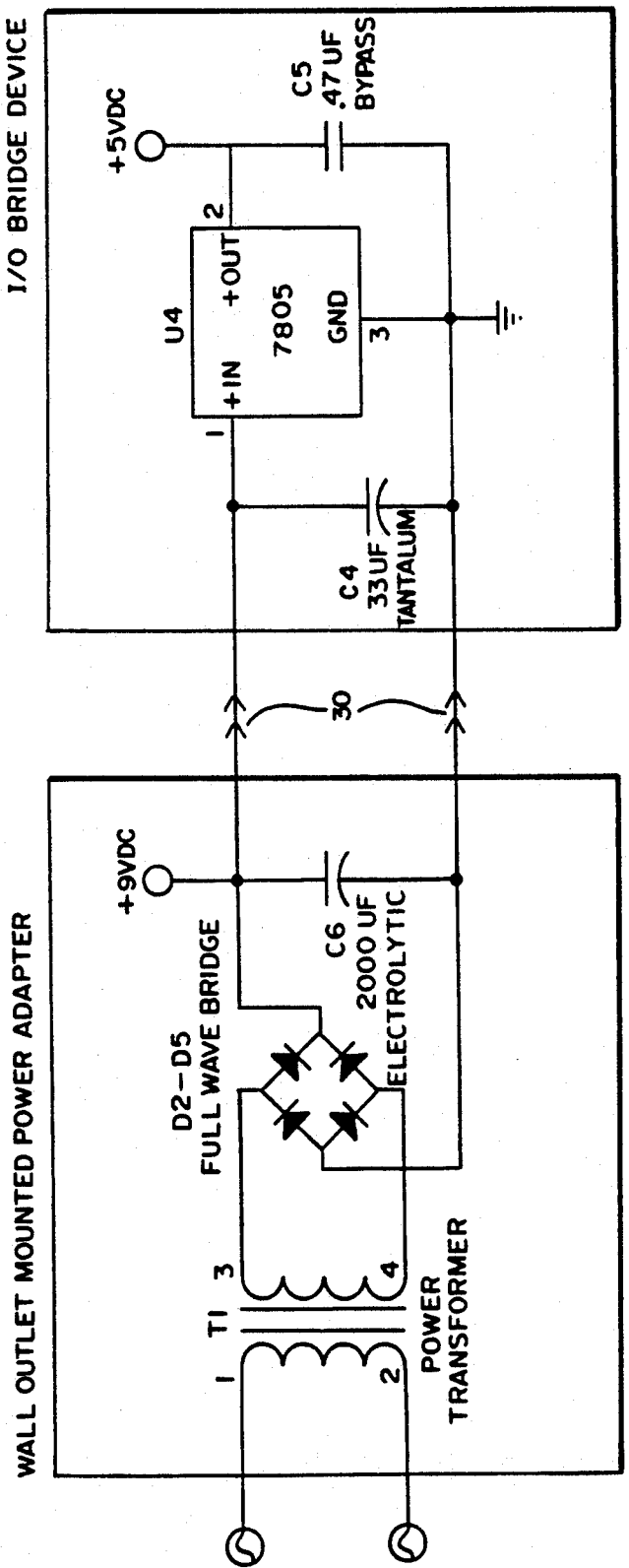
FIG. 15 is a schematic diagram of the power supply, and filter and regulator therefor, of the device of FIG. 1.

Turning now to FIGS. 4A–4D, there is illustrated therein a schematic circuit diagram of the components of the I/O Bridge device 10 showing their interconnections. In general, the I/O Bridge device 10 is provided with a self-contained external power adapter (FIG. 15). This power source is a unipolar supply providing working voltages within the I/O Bridge device 10 which are primarily positive with respect to ground. The power is provided from a conventional wall outlet, is converted to DC power, and is filtered to provide a source of single-polarity voltage of approximately +9 volts. Alternatively, the power source may be any suitable battery which would permit remote or field use. The +9 volt supply is then regulated to +5 volts by a standard three-terminal regulator integrated circuit U4 (FIG. 6), and all digital circuits (as will be described below) of the I/O Bridge device 10 are powered from this +5 volt source. The analog input comparators of the I/O Bridge device 10, on the other hand, are powered with +9 volts and ground, with their open-collector outputs being pulled up to +5 volts to interface with the 6518. The particular quad comparators were chosen for unipolar applications, having PNP input stages which include ground in their common-mode range. These comparators will be described below.

As shown in FIG. 15, a wall outlet adapter provides the +9 volt filtered DC output to the device 10 through the rear panel power input jack 30. The rear panel jack 30 is connected to a type 7805 monolithic three-terminal voltage regulator, labeled 7805, which provides a +5 VDC filtered and regulated output. Capacitors C4 and C5 are connected as shown in FIG. 6 and FIG. 15. The +5 volt output is directed to all of the digital integrated circuits described below, and to all of the pull-up resistors shown throughout FIG. 4A–4D. The unregulated, but filtered, +9 volt output, is directed to a voltage inverter circuit 102 (described below), to a positive power supply pin (pin 8) of an operational amplifier TL082, and to a positive power supply pin (pin 3) of a quad comparator LM339A.

Figure 10:
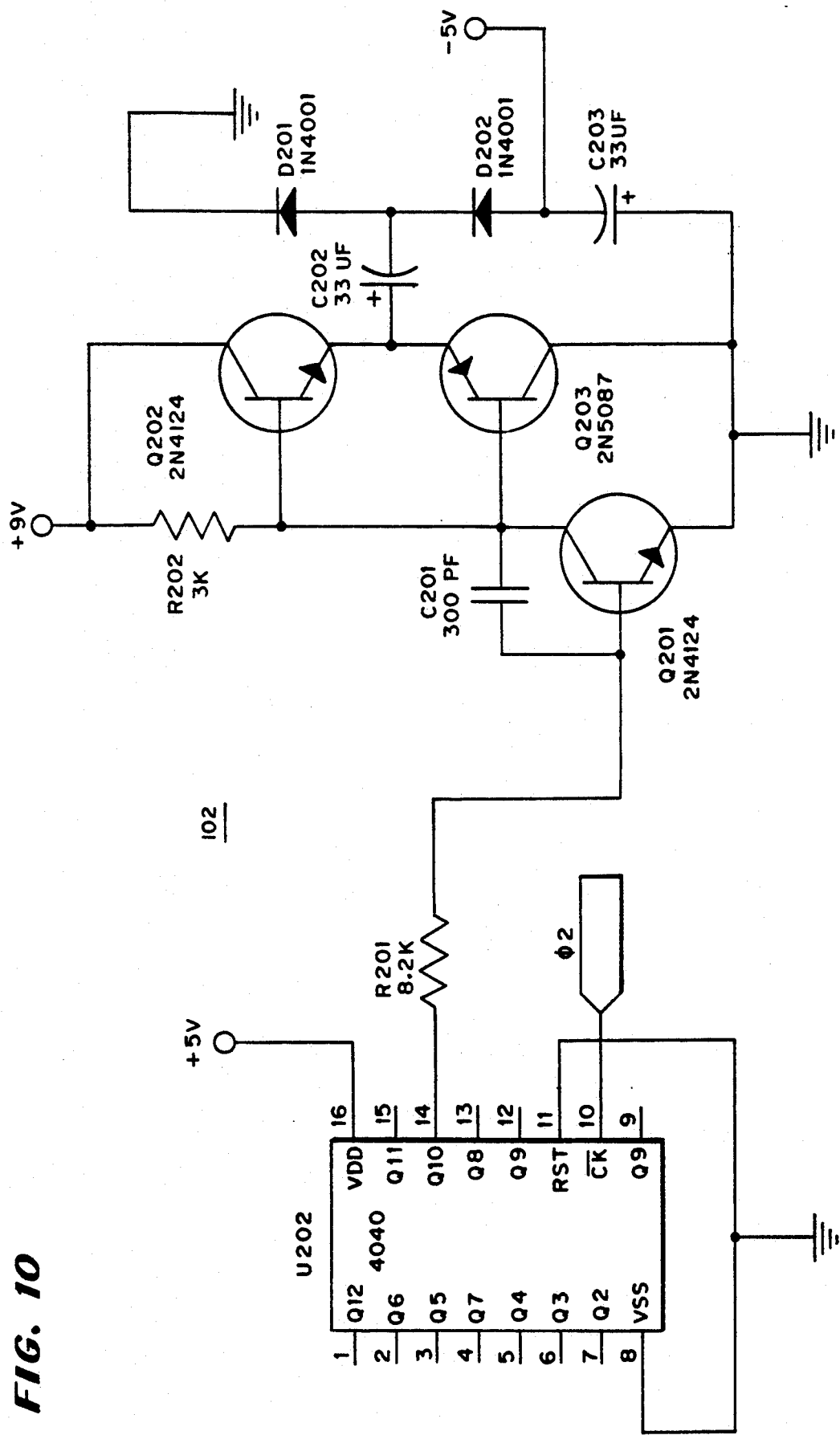
FIG. 10 is a schematic diagram of the circuitry of a power supply voltage inverter of the device of FIG. 1.

It is to be noted that the TL082 operational amplifiers of the device also require a negative supply voltage in order to maintain linearity, with their outputs being at or near ground. This is provided by a power inverter circuit 102 shown in FIG. 4B and FIG. 10. An integrated circuit U202 divides the 6518's main clock (which is maintained at one MHz) down to a relatively low frequency. The signal is then amplified by Q201 and presented to Q202 and Q203. The push-pull pair defined by Q202 and Q203 alternately charge C202 through D201 on positive swings, and then charge C203 through D202 on negative swings, providing a result of a filtered negative DC voltage on C203. The −5 volt DC voltage is transferred to the operational amplifier negative supply pin. Capacitor C201 is used to lengthen rise and fall times in order to reduce harmonics coupled into other parts of the I/O Bridge device 10.

Figure 4A:
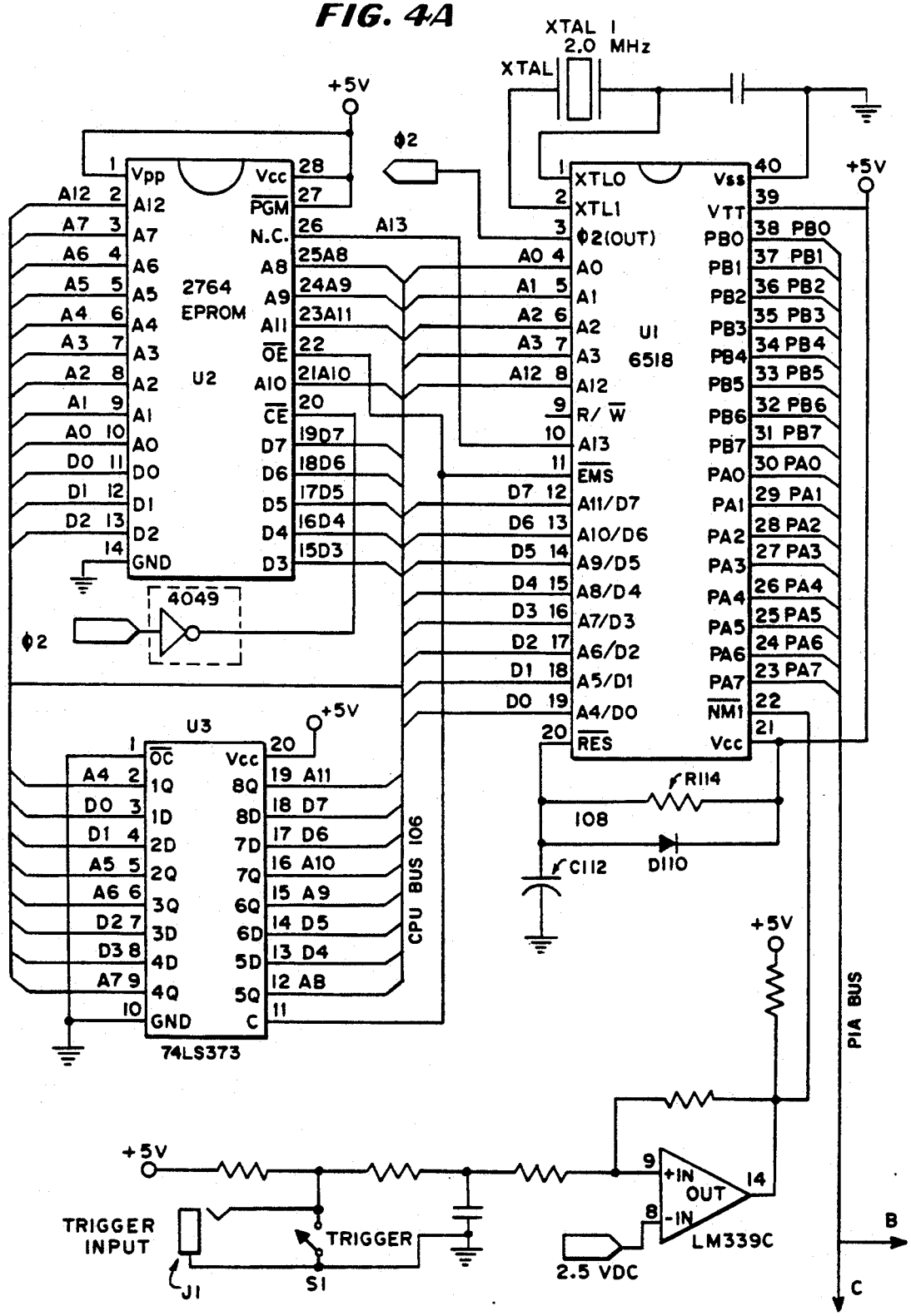
FIGS. 4A–4D comprise a detailed schematic diagram of the circuitry of the device shown in the block diagram of FIG. 3.
Figure 4B:
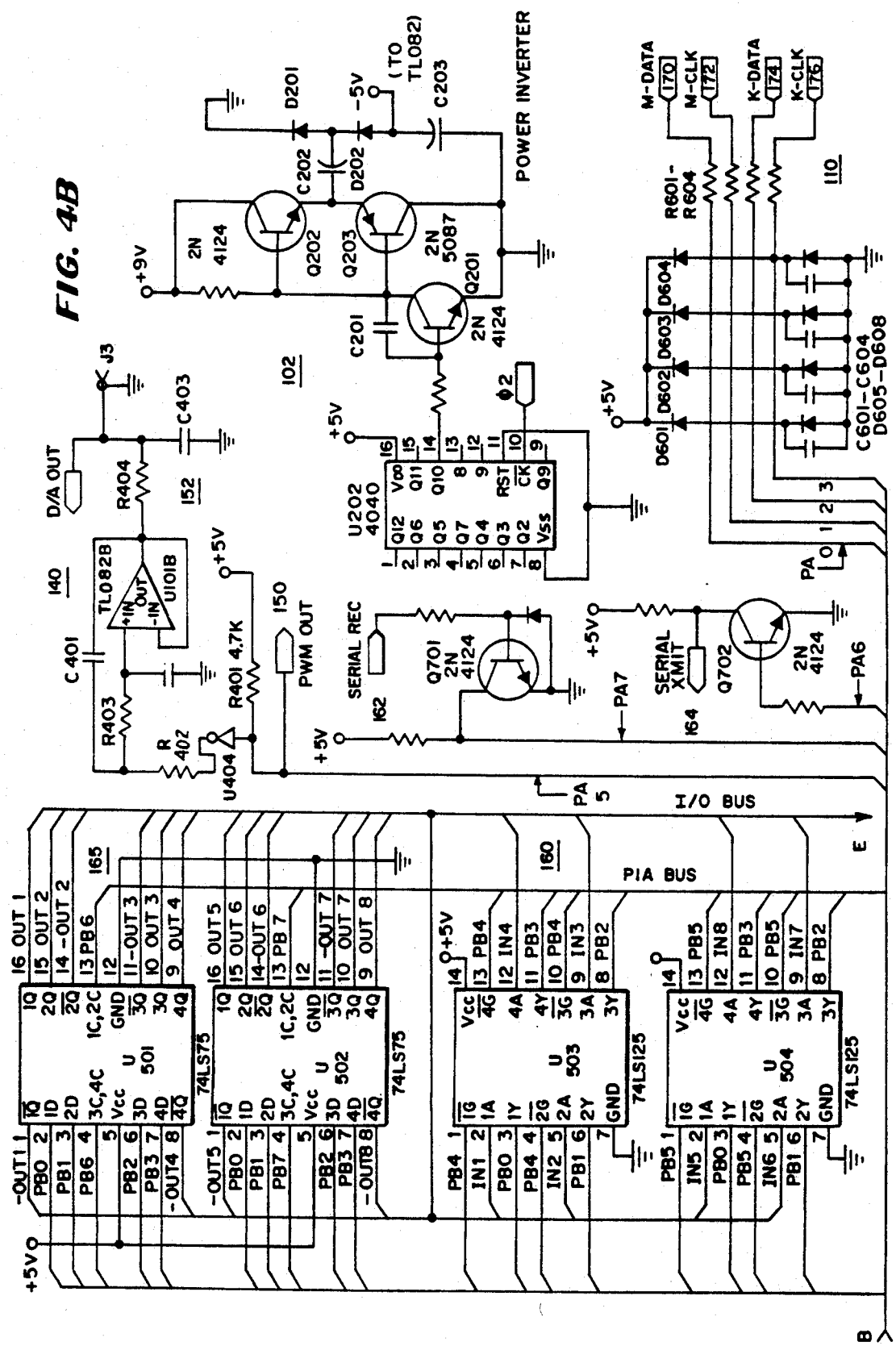
Figure 13:
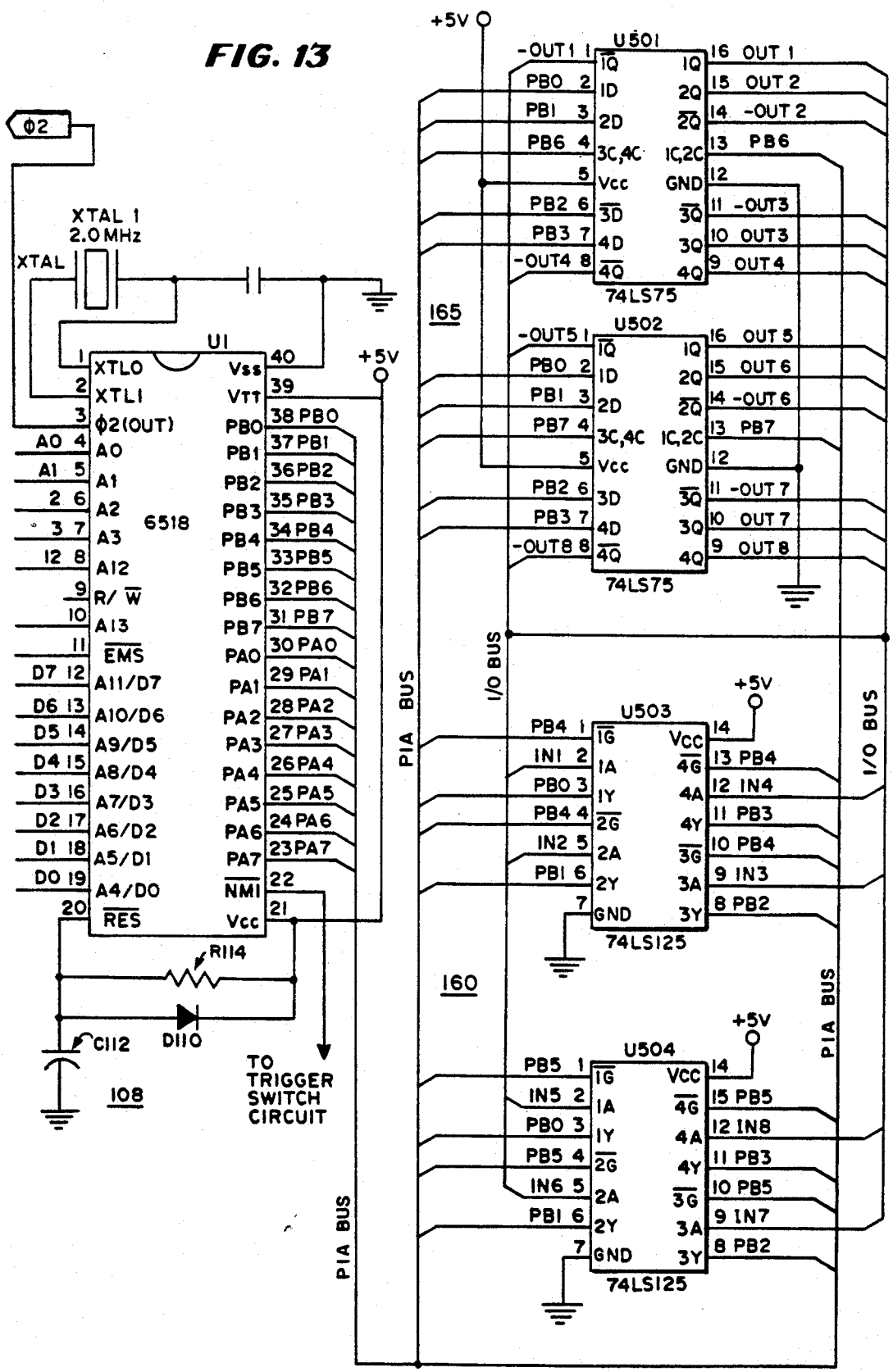
FIG. 13 is a schematic diagram showing the interconnections between the microcontroller and the digital input and output registers of the device of FIG. 1.

When power is supplied to the microcontroller U1 (FIG. 4A) of the device 10, it reads a reset vector address from the read only memory U2 which, in this case, is an industry standard 2764 EPROM manufactured by Hitachi. The reset vector directs U1 to a specific program sequence in the ROM U2 which sets up all internal registers of U1, and also resets external registers contained in a parallel output circuit defined by the data lines called PIA BUS running to quad latches U501 and U502 (FIG. 4B and FIG. 13). Once the reset procedure has been accomplished, U1 then begins polling the keyboard interface circuit 110 to determine when commands come in from a host CPU and to determine when responses should be sent back to the host CPU. This is done repetitively, many times per second, in a process that would seem transparent to the user, happening frequently enough that the user sees a response as virtually instantaneous.

The 6518 microcontroller from Rockwell is a 6502-type CPU with internal parallel registers, a serial input and output, as well as other features described herein. The microcontroller 6518 has an internal clock oscillator connected to a 2-MHz crystal XTALI (FIG. 4A and FIG. 13). Microcontroller U1 has a phase-2 clock output which is its main clock output that is derived from the crystal oscillator clock. The phase-2 signal is used to synchronize the reading of the read only memory U2, and is also used to synchronize the power inverter integrated circuit U202 (FIG. 4B). As described above, U202 comprises a type 4040 countdown chip used to derive a low clock frequency which, in turn, drives the power inverter transistor Q201. The power inverter circuit 102 is used to generate a negative voltage of −5 VDC which is supplied to a negative power input pin of the dual operational amplifier TL082.

The microcontroller U1 has an external memory bus, CPU BUS 106 (FIG. 4A), through which data and program instructions from the ROM U2 are received. The CPU BUS 106 is multiplexed by way of a 74LS373 octal latch U3. The octal latch U3 is used to hold address bits during a period of time at which data passes across the bus 106.

The microcontroller U1 uses a simple R-C (resistor R114-capacitor C112) reset circuit 108 connected to pin 20 of U1. A diode D110 is connected across the resistor R114 to speed up the response when power is removed, at which time the capacitor C112, which is connected from pin 20 to ground, discharges through the diode D110 rather than through the resistor R114. This provides a faster reset time than would otherwise be provided.

The microcontroller U1 has both maskable and non-maskable interrupts. The maskable interrupts are internal only. They arise in the internal interface registers 116. The non-maskable interrupt (NMI) is external only (pin 22 of U1) and is supplied by a comparator LM339C (FIG. 4A) which receives its input from the front panel trigger switch S1 or the trigger input jack J1. This allows the user to signal U1 when to take a reading to be sent to the keyboard interface 110.

A 4049 inverter (FIG. 4A) is used to invert the phase-2 clock signal provided to the read only memory U2. This signal inversion is necessary because the logic level of the phase-2 clock is inverted from that necessary for the ROM U2.

The I/O Bridge device 10 further includes four integrated circuits, i.e., two 74LS75s and two 74LS125s (FIG. 4B and FIG. 13). These constitute the input registers U503 and U504, and output registers U501 and U502. Port B of microcontroller U1 has eight bidirectional data lines PB0–PB7. The four integrated circuits U501-U504 are used to expand the eight data lines to eight separate inputs and eight separate outputs as shown. Input registers U503 and U504 are gated 74LS125 tristate buffers. Each can be enabled separately by the microcontroller U1 in order to impress incoming data onto the remaining data lines PB0 through PB3 of 1 microcontroller U1. This connection is termed PIA BUS in FIG. 4B. Output registers U501 and U502 are 74LS75 output latches. Each 74LS75 is a quad latch with both inverted and non-inverted outputs. The non-inverted Q outputs are connected to the rear panel DB-25 connector 28 of the device 10. The inverted-Q outputs (also shown as —OUT) are connected to a series of eight light emitting diodes D501-D508 (FIG. 4C) with series resistors R501-R508, respectively, which limit the current being supplied to the LEDs. The purpose of the LEDs D501-D508 is to indicate the status at any time of the eight output lines OUT1 through OUT8.

The microcontroller U1 executes a preprogrammed algorithm (described below) for enabling each of the input and output registers of the device 10 in turn to selectively set or clear any of the output lines OUT-1–OUT8 and to selectively read any of the input lines IN1-IN8. Execution of the algorithm is transparent to the user when the device is operating in the enhanced mode, to be described below, via commands received from the CPU in the desktop computer.

A D/A conversion circuit 140 (FIG. 4B and FIG. 12) is provided which receives pulse-width modulated signals from U1 via the PA5 line 150. The pulse-width modulated output can be varied in duty cycle and pulse repetition rate. Variations in duty cycle appear as variations in DC voltage at the output of the integrated circuit filter formed by operational amplifier TL082B. An additional R-C filter 152 is present at the output of operational amplifier TL082B to filter out any power supply noise that may be present at the output.

As shown in FIG. 4B, two 2N4124 transistor inverters Q701 and Q702 are also provided for serial receive and serial transmit. This feature is mainly used for debugging, although it does have other uses. A remote computer terminal may be connected to the receive pin 162 and transmit pin 164 to enter serial commands and to receive serial data from U1.

A further circuit shown in FIG. 4B and FIG. 5 is the keyboard interface 110 (for the MACINTOSH PLUS computer) which connects four external signal lines 170, 172, 174, and 176 to U1's Port A register lines PA0, PA1, PA2, and PA3 as shown. A clamping circuit 180 is provided on each keyboard interface line to form a voltage clamping network to clamp input voltages using back-to-back diodes D601-D608. Clamping is necessary to protect the inputs of the microcontroller U1 from voltage spikes. Small-value surge resistors R601-R604 of 15 ohms each are also provided to limit current in the event that a short circuit on the lines should occur.

Continuing with FIG. 5, the jacks J601 and J602 for the keyboard and the host CPU, respectively, are shown. It will be seen that the PA0 line connects to a terminal labeled M-data (MACINTOSH data), which is the host CPU's data line. The M-data line 170 is connected to pin 3 of the telephone-style connector or jack J602. The signal line associated with pin 3 reaches the host CPU and connects to its keyboard interface (not shown) which allows data and commands to be passed back and forth. The PA1 line is labeled M-clock (MACINTOSH clock). The M-clock line 172 is connected to the host CPU through pin 2 of jack J602. The PA2 line is called K-data (keyboard data). The K-data line 174 is connected to a keyboard device through pin 3 of the keyboard jack J601. Finally, the PA3 line is called K-clock (keyboard clock) The K-clock line 176 is connected to pin 2 of the keyboard jack J601.

Although the I/O Bridge device 10 receives all of its power from an external power supply as described above, the keyboard expects to receive its power from the host CPU. Supply of such power is provided by a jumper 210 connected between pin 4 of the keyboard jack J601 and pin 4 of the CPU jack J602. Again note that the particular use of lines PA0 through PA3 described above relates to the MACINTOSH PLUS computer interface.

Returning to FIG. 4C, the eight analog inputs to the 4051 input selector U301 can range in voltage from zero to five volts to produce an analog-to-digital (A/D) reading. Inputs that are less than 0 VDC will result in a reading simply called "under". Voltage inputs that are greater than 5 VDC will result in a reading of "over". 11 In other words, such readings are beyond the linear limits set for the device in the preferred embodiment. However, this is not to be considered limiting, as the design can be modified to accommodate an input range from zero to ten volts. The tachometer input PA4 (FIG. 4D) is expected to be a pulse width, ranging from a logic low between zero and +0.8 volts, to a logic high of ranging from +2.5 volts to +5.0 volts. The keyboard inputs and outputs (FIG. 4B), consisting of M-data 170, M-clock 172, K-data 174, and K-clock 176, are standard logic levels having a logic low of between zero to +0.8 volts, and a logic high of from +2.5 volts to +5.0 volts. The trigger input S1 (FIG. 4A), which generates a nonmaskable interrupt in U1, is considered to be a switch closure to ground. The interrupt voltage would be active at any input voltage below approximately 2.0

VDC, because there is a slight amount of hysteresis built into the LM339C circuit of approximately ten percent.

The pulse-width modulated output PA5 (FIG. 4B and FIG. 12) has a standard 0-5 VDC logic level. The output signal is pulled up to the positive rail with a resistor R401 of 4.7 kilohms. When the PA5 output logic level is low, PA5 is pulled down to ground by an open drain transistor device internal to the microcontroller U1. This output is connected to the D/A output filter 140, comprising TL082B and associated components, through buffer U404. The voltage level output from filter 152 ranges from approximately zero to a high level of approximately 5.0 volts.

Figure 4C:
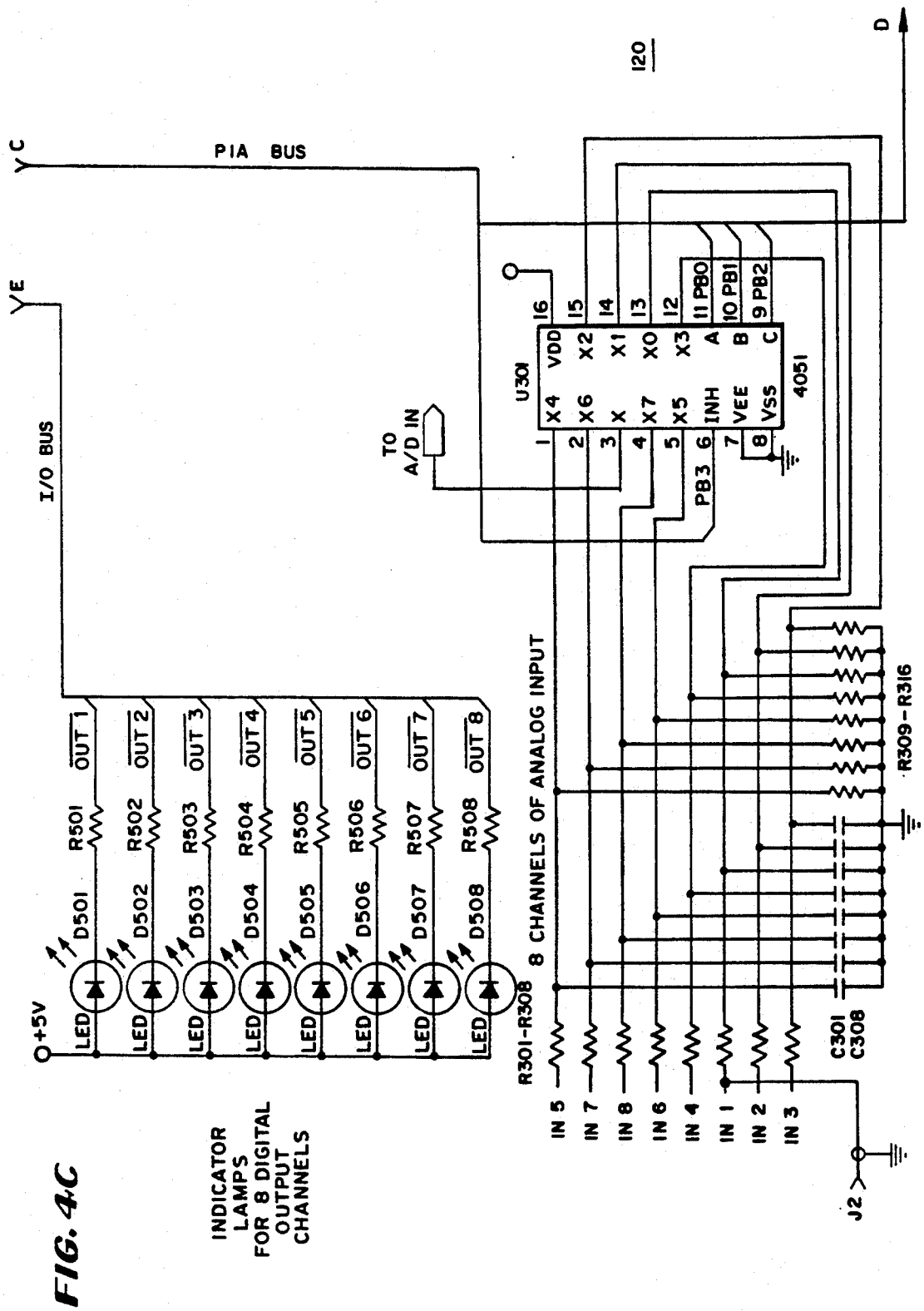
Figure 4D:
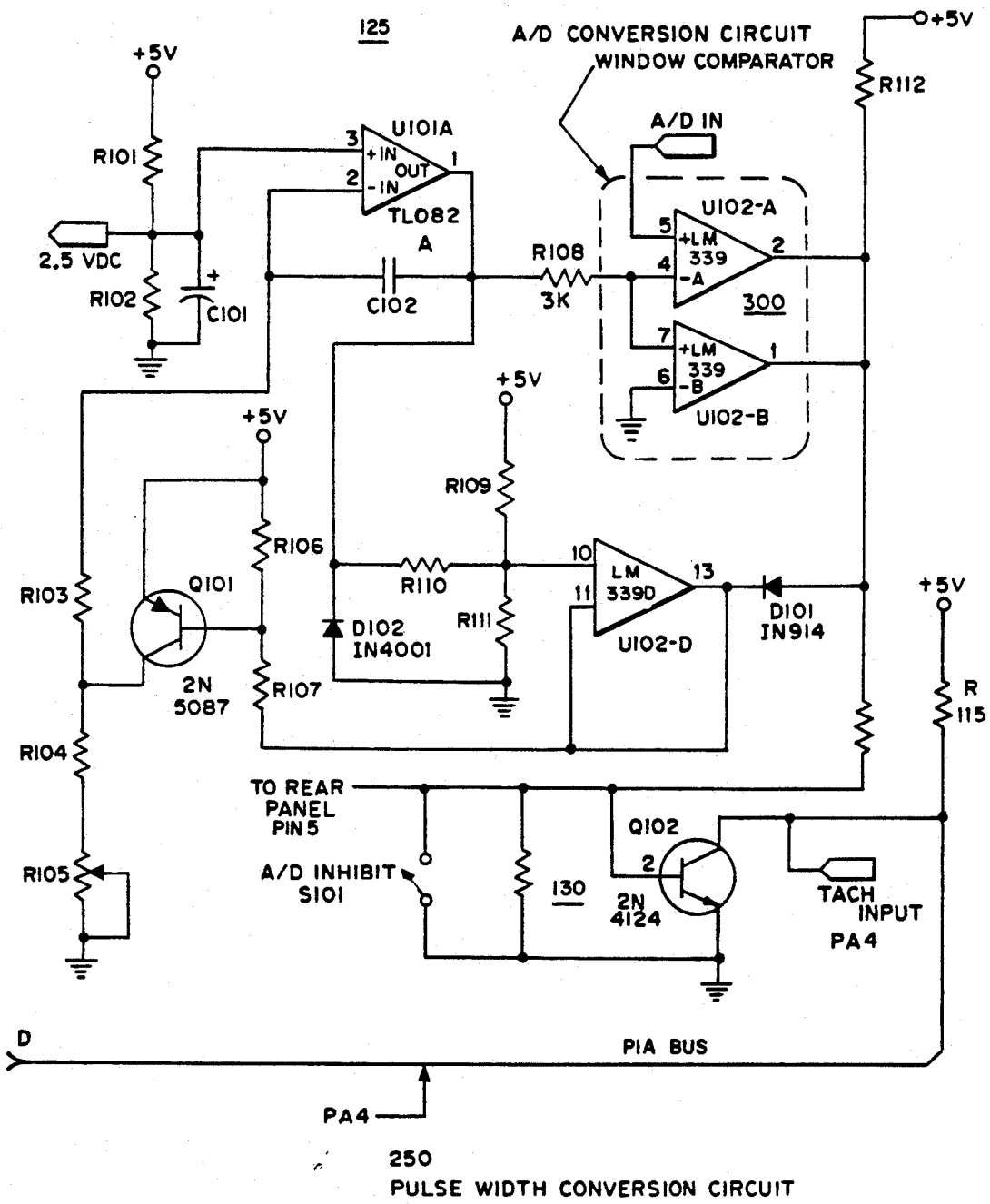

A special input, called A/D inhibit, is shown in the schematic diagram of FIG. 4D as a switch S101 connected to ground. The switch S101 is used to disable the buffer transistor Q102. Disabling the buffer Q102 permits external inputs to operate the tachometer input, PA4. If the A/D inhibit switch S101 is not closed, then signals from the A/D conversion circuit 125 would interfere with any pulse-width measurement signals presented to PA4 from outside the device 10.

The digital output registers U501 and U502 and the digital input registers U503 and U504 (FIG. 4B and FIG. 13) are standard LS devices including low power Schottky transistors in their internal structure. There are four output lines per output register U501, U502, which are conventional totem pole outputs. There are four input lines per input register U503, U504, which are conventional multiple-emitter input circuits. The standard logic levels are: on output, a logic low from 0.0 to 0.4 volts, and a logic high from 2.5 to 5.0 volts; on input, a logic low from 0.0 to 0.8 volts, and a logic high of from 2.0 to 5.0 volts.

Figure 11:
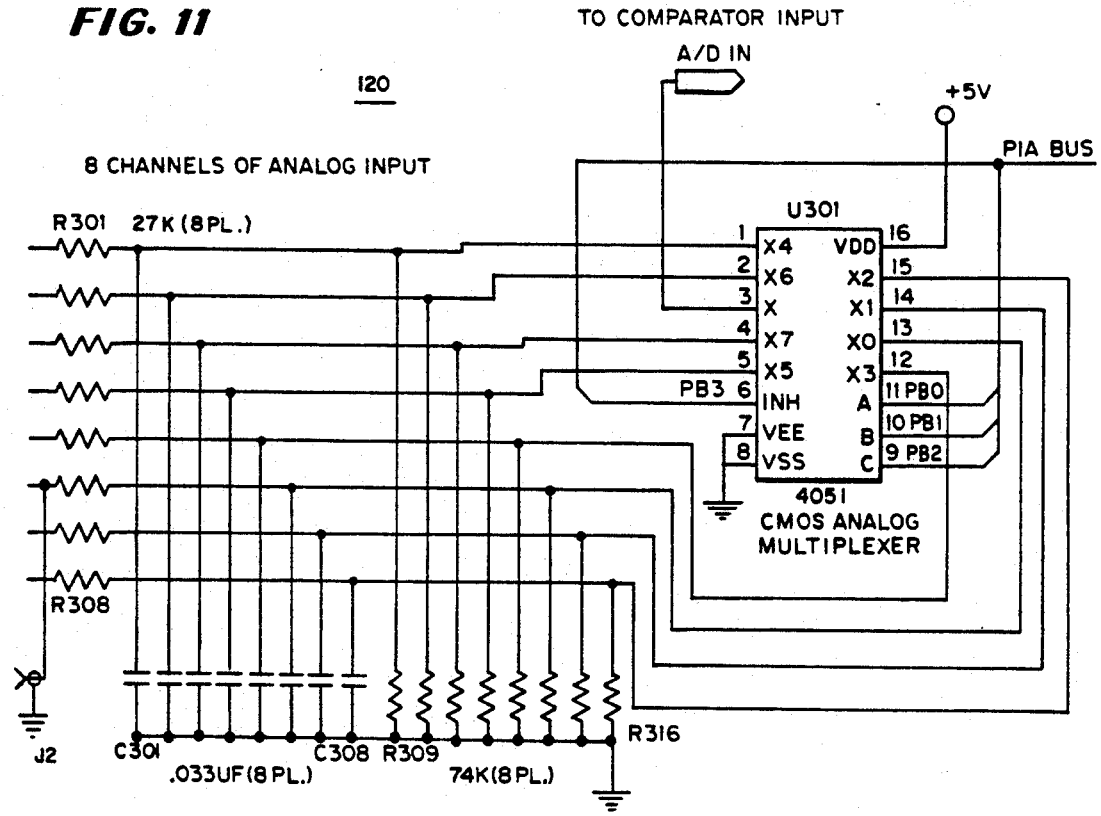
FIG. 11 is a schematic diagram of an eight-channel analog input selector of the device of FIG. 1.
Figure 12:
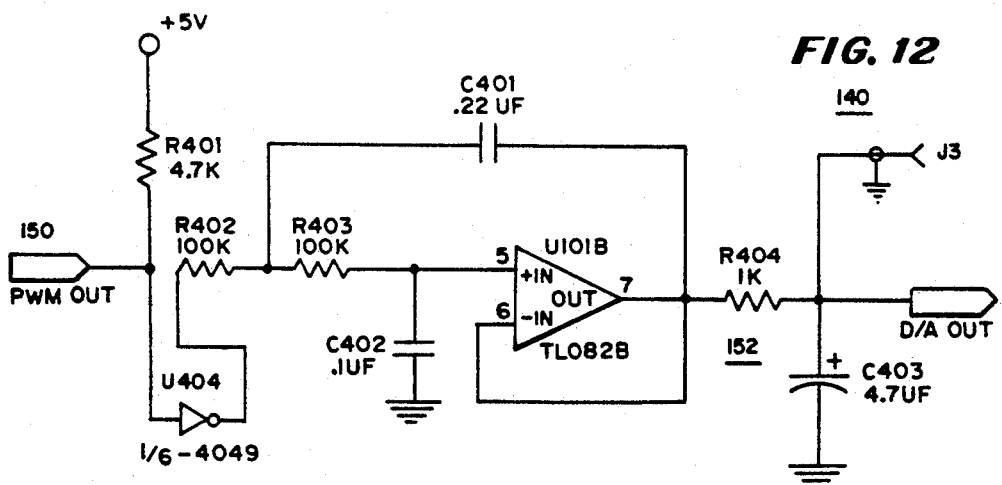
FIG. 12 is a schematic diagram of a pulse-width-to-analog output filter of the device of FIG. 1.

Using the simple example of measuring the voltage of a battery with regard to operation of the I/O Bridge device 10, the battery would be connected to one of the input channels of the analog input selector 120 (e.g., IN1 via J2 of FIG. 4C and FIG. 11). The analog input signal is attenuated by one of the resistors R301-R308 and by cooperating resistor R309-R316. The attenuated signal is presented to one of the X inputs of the 4051 analog multiplexer U301. In the simple case of measuring the battery voltage via J2, the attenuated signal could be connected to X0. Input X0 is selected by lowering PB0, PB1, and PB2 in U1, thus lowering lines A, B, and C of the analog multiplexer U301. The selected input is presented to the multiplexer output labeled X, pin 3.

From there, the selected analog input is routed to the A/D input connection (FIG. 4D, FIG. 7, and FIG. 9) which is the non-inverting input of U102A. This is the input to the window comparator 300 which is considered the upper limit. Microcontroller U1 waits for an A/D conversion cycle to start, at which time the output of U101A, pin 1 of the TL082A, is slightly below zero volts and rising in linear mode. As it rises through zero, the comparator LM339B releases its output line, which then goes high. The output is inverted through the 2N4124 transistor Q102, thus This starts a timing cycle inside U1. Microcontroller U1 counts microseconds (clock cycles) as the linear input rises.

Referring to FIG. 8, it can be seen that as the ramp voltage rises through zero, the LM339B releases its output line. In FIG. 8, this waveform is labelled the comparator output, initially at a high logic level or a true state. As the linear ramp increases in voltage, it will pass through the A/D input voltage level. In the example of the measurement of a battery voltage, the analog input is at 1.5 volts, which is attenuated to roughly 1 volt. As the linear ramp rises through 1 volt, the LM339A will pull the output logic level low, or to a false state. This is shown in FIG. 8 as the comparator output falling to a low state after the ramp passes through the input voltage. This, in turn biases off the inverting transistor Q102, allowing the PA4 input to rise, which halts the timing cycle in U1. The number of microseconds that have been counted is stored in the timer register 116. Further counts do not occur at this time. Microcontroller U1 reads the number of counts from the timer register. Since it acts as a countdown timer, U1 executes a subtraction process to get a positive number of microseconds during which the comparator output was true. The duration of time for which the comparator output was true is linearly proportional to the A/D input voltage.

Figure 16:
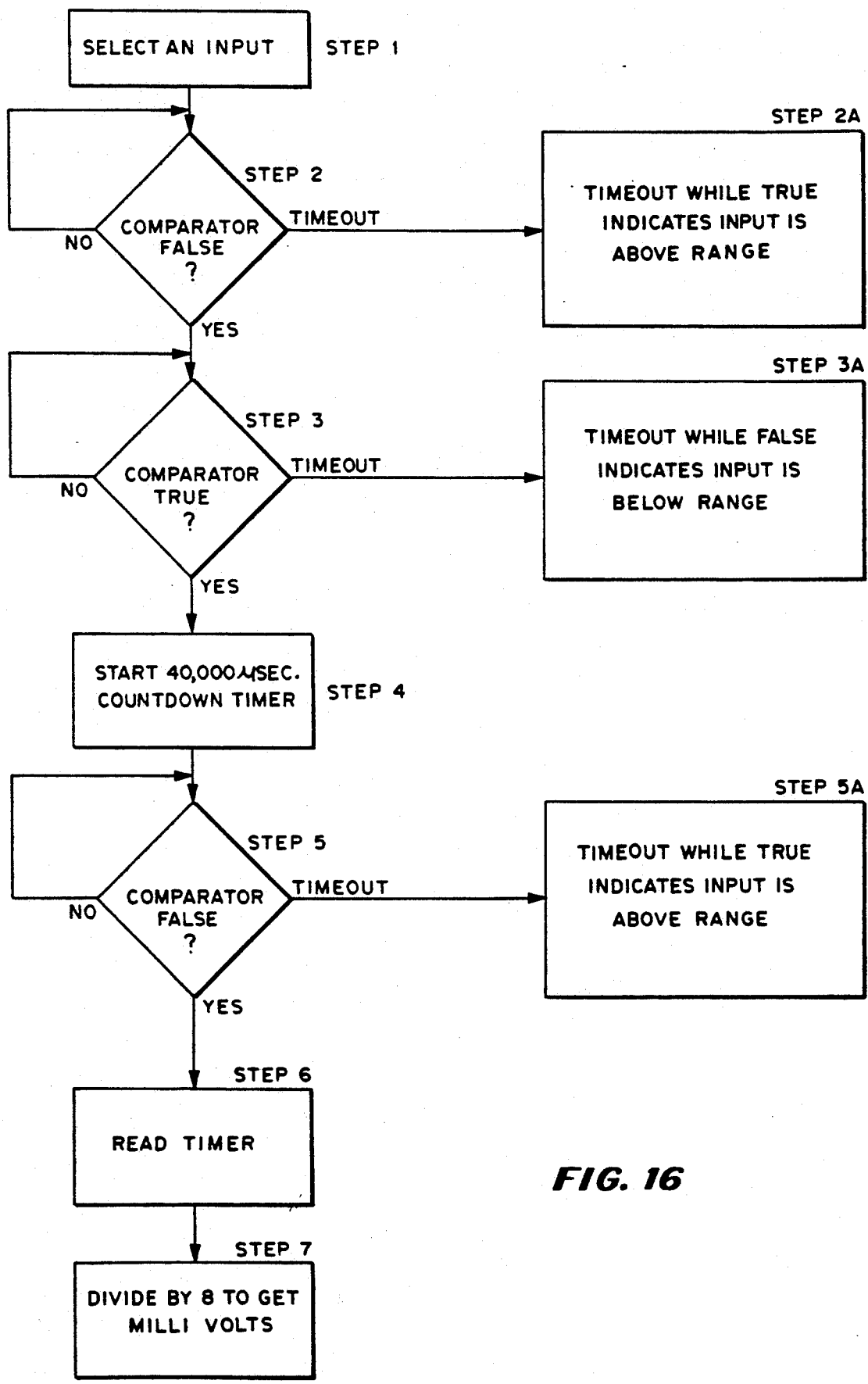
FIG. 16 sets forth a program flow diagram of an algorithm used by the microcontroller to convert the window comparator's pulse-width output into a digital representation of the measured voltage.

The conversion algorithm described in the flowchart of FIG. 16 returns the number of millivolts above 0 volts which are present for a given analog input. As seen above, these analog inputs are attenuated and selected by the analog input selector 120 before being converted to a digital signal by the A/D circuit 125. A binary value is produced in this manner establishing the exact number of millivolts that have been measured. This measurement can then be converted, through the algorithm described in the flowchart of FIG. 19, to a decimal value, which can then be converted to an ASCII text string, which, in turn, can be transmitted to the host CPU.

In order to receive a digital input, microcontroller U1 alternately enables one of the two 74LS125 input buffers U503 or U504 (FIG. 4B and FIG. 13), each buffer presenting four input lines to four lines of U1. The lines of U1 that receive the input data are PB0, PB1, PB2, and PB3. The input buffers are enabled by lines PB4 and PB5. Only one buffer is enabled at a time so that the data does not conflict. In outputting the digital data, U1 disables both 74LS125 input buffers, supplies the data to PB0, PB1, PB2, and PB3, and then clocks one of the 74LS75 output latches U501 or U502. Each of the 74LS75 circuits has four output lines. These outputs are latched to hold the values clocked into them, regardless of further states of PB0 through PB3.

The pulse-width modulated output 150 (FIG. 4B and FIG. 12) is a variable duty cycle, variable pulse rate output which is controlled by setting two timer registers inside U1. One timer register stores the number of microseconds for which the output is high. The other register stores the number of microseconds for which the output is low. By setting the two registers, the overall duty cycle and repetition rate can be established. Once the repetition rate has been set, a square wave of a known duty cycle is presented to the D/A conversion circuit 140. The square wave is then filtered to produce a DC voltage linearly proportional to the duty cycle of the pulse-width modulated output.

Although the pulse-width modulated output 150 is supplied via line PA5, this line can also serve an alternate function. PA5 is also usable as an event counter (pulse counting) input. The two functions of PA5 cannot occur simultaneously, but the internal registers of U1 may be set to count external events consisting of logic pulses presented to PA5 from outside the device 10. The logic pulses are counted and totaled within U1 registers, and are enabled for transmission to the host CPU under special command.

An alternate use is also proposed for line PA4 of U1. Such alternate use is provided for measuring the pulse width of external pulses. For instance, a logic signal present in an experiment could be connected to line PA4 (FIG. 4D) via the tachometer input. Microcontroller U1 then could determine the low logic duration of a pulse accurately to within one microsecond, over an unlimited range. In this respect, it will be understood that the counter register 116 can count any number of pulses up to 65,535, setting 16 bits. Beyond 65,535 pulses, interrupts can be generated by the counter register to keep a tally of counter overflows. Using this technique, any number of microseconds can be counted. The same unlimited range is available for counting external events via line PA5; thus any number of events can be counted.

The outputs from microcontroller U1 are applied in two different ways, depending upon the type of keyboard interface used by the PC. As mentioned above, one keyboard interface is used for the MACINTOSH PLUS and another for the MACINTOSH II with the APPLE DESKTOP BUS (ADB). For the MACINTOSH PLUS keyboard interface circuit 110, the designations M-data, M-clock, K-data, and K-clock apply as shown in FIG. 4B and FIG. 5. M-data 170 is a bidirectional data line which is pulled high by a resistor on the host computer side. It can be pulled low either by the MACINTOSH or by U1 through PA0. The logic state of line 170 is also monitored by U1. M-clock 172 is an I/O Bridge output only, which is presented to the MACINTOSH and is only controlled by U1. The K-data line 174 is bidirectional, and can be connected to a conventional MACINTOSH keyboard or other compatible keyboard bus device. Since it is bidirectional, it can be pulled to a logic low level by either U1 or the keyboard device, and is pulled up by a resistor inside U1. The K-clock line 176 is controlled by the keyboard which is externally connected. The K-clock line is the keyboard device's clock output, which is exclusively monitored by U1 through PA3.

Figure 14:
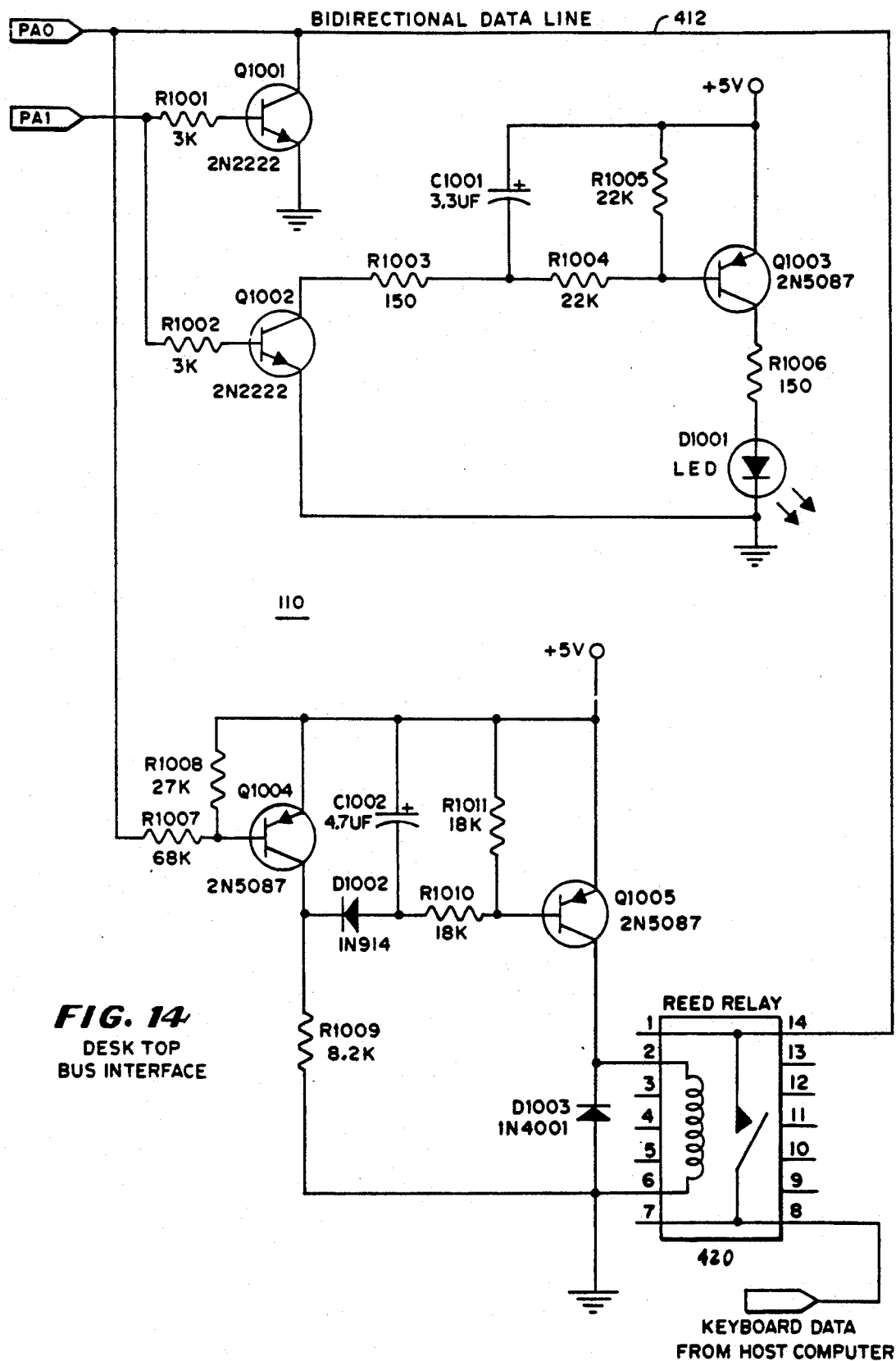
FIG. 14 is a schematic diagram of the bidirectional keyboard bus interface circuitry for the APPLE DESKTOP BUS (a trademark of Apple Computer Inc.).

When the I/O Bridge is placed into operation with the MACINTOSH II keyboard interface shown in FIG. 14, only two lines, PB0 and PB1, are used: one to monitor the status of the bidirectional data bus line 412, and the other to operate a transistor inverter which is able to pull that line to a logic level low. Therefore, U1 can both read data and send data over the single, bidirectional data line 412 shown in FIG. 14.

Hence, the operation of the keyboard interface of the I/O Bridge device 10 can be executed in two different manners, depending upon the host PC connected. Using the MACINTOSH PLUS keyboard interface of FIG. 5, when the user presses on a key on the keyboard, the device 10 must respond to that keystroke in order to pass the key codes through to the host CPU. The I/O Bridge device 10 senses that a keystroke has occurred via the K-data and K-clock signals present on lines PA2 and PA3 of the keyboard interface 110. The device 10 decodes the signals, re-encodes them, and presents them on signal lines PA0 and PA1 as M-data and M-clock to forward those key codes to the MACINTOSH PLUS PC. If multiple I/O Bridge devices 10 are connected in series, each, in turn, receives keyboard responses and sends them toward the 11 host CPU. Each I/O Bridge device 10 also receives commands issued by the host CPU, and sends them toward the keyboard.

When a MACINTOSH II PC is used, which utilizes the APPLE DESKTOP BUS keyboard interface of FIG. 14, the I/O Bridge device 10 behaves differently. Since the APPLE DESKTOP BUS is a parallel bus, the device 10 looks for commands directed only to its specific address. The APPLE DESKTOP BUS protocol provides for sixteen logical addresses at which an ADB device may exist, eight of which are available. In the preferred embodiment, eight I/O Bridge devices may be connected to the ADB, typically only one device per address. Therefore, operation of the keyboard is transparent to the user, i.e., the user presses a key, and the host CPU receives the keystroke.

To take an analog measurement using the device 10 in the normal mode of operation (described below), the user presses trigger switch S1 (FIG. 4A) or activates a trigger input signal via J1 of the device 10. This pulls down the non-inverting input of comparator LM339C, and, in turn, pulls down pin 22 of U1, which is the non-maskable interrupt (NMI) generating an interrupt. When the interrupt occurs, an address vector is fetched from the EPROM U2 which points to an interrupt routine, which is then executed. Execution of that interrupt routine sets a measurement request flag so that, when U1 observes that no keystrokes are being pressed and no commands are being received from the host CPU, U1 checks the status of the flag bit. If the flag has been set, U1 begins an analog input sequence, using the A/D converter 125 (FIG. 4D) to provide signals to line PA4.

The microcontroller U1 does not output any signals during the A/D conversion cycle. It merely reads the pulse width of pulses present on line PA4 according to the algorithm (programmed in the EPROM U2) described below in FIG. 16. After U1 senses a complete pulse, measures its width, and calculates the related input voltage, the input voltage is converted to ASCII text using a look-up table in the read only memory U2 (FIG. 3). The ASCII text is then converted to, in this example, MACINTOSH key codes. The key codes are arbitrarily assigned codes determined in this case by Apple Computer, each of which relates uniquely to a particular keystroke on the keyboard. Microcontroller U1, through unique programming, generates key codes which emulate the keyboard completely and presents the key codes to the CPU of the MACINTOSH via signal lines PA0 and PA1. Thus, the host CPU, upon receiving the key codes from U1, assumes that the user has typed in the numeric value of the analog measurement via the keyboard.

Typically, a single input of the analog multiplexer is selected, usually input X0 shown at pin 13 of the 4051 analog multiplexer U301 (FIG. 4C and FIG. 11). The user can also elect to take multiple measurements when the trigger switch S1 is closed. In that case, U1 will sequentially connect several inputs of the analog multiplexer U301 to the A/D conversion circuit 125, measure the pulse width, convert each pulse width into a decimal ASCII string, convert each string into a series of key codes, send those key codes to the host CPU, follow each measurement with a field delimiter (typically a tab key code), and follow the complete sequence of measurements with a record delimiter (usually the key code for the return key).

Inverting transistor Q102 (FIG. 4D) is interposed between the output of the A/D conversion circuit 125 and the PA4 signal line, which is pin 26 of U1. The inverter Q102 is needed because U1 is designed to measure negative-going pulse widths, while the output of the window comparator 300 is provided as a positive-going pulse width. The inverter Q102 is thus necessary to allow U1 to process the output of the window comparator 300. Additionally, an A/D inhibit switch S101 can be used as necessary to disable the inverter Q102 so that other external signals can be supplied to line PA4, allowing U1 to make pulse-width measurements without interference from any A/D conversion. The A/D inhibit switch S101 would be closed during tachometer or speed-measuring operations, such as the measurement of the speed of a rotating device or rotating piece of machinery connected via the tachometer input.

There are eight digital output lines OUT1–OUT8 (FIG. 4B and FIG. 13) available to the user which can only be controlled in the enhanced mode of operation (described below) of the I/O Bridge device 10. These output lines can be controlled by sending special commands from the host CPU to the I/O Bridge device 10, and are not normally controlled in the absence of special driver software loaded into the host CPU. Each of the eight output lines can be independently set to a logic true, +5 volts, or to a logic false, 0 volts. Eight LED indicators D501–508 (FIG. 4C) show immediately the status of these output lines.

In operation, the output lines OUT1–OUT8 would be connected to relays or other circuit devices so that the user could control, for example, the lights in a house. In this way, a relay could be closed or opened to turn a light on or off, to turn a heater on or off, etc. The digital output lines OUT1–OUT8 could also be used to control an alarm, a beeper, a buzzer, a bell, etc., or to signal the user that some conditional parameter is outside of limits set by the user.

In the enhanced mode of operation (described below), additional input conditions can be measured beyond the simple analog voltage measurement described above. This can be accomplished by generating special commands in the host CPU other than those normally sent to the keyboard device. For MACINTOSH PLUS applications, the keyboard device normally receives only a "selftest" command, i.e., a command to which the keyboard responds with its model number to advise what type of keyboard is connected, and a command for reading the status of the keyboard, i.e., whether or not any key has been depressed. Additional enhanced mode commands have been developed, as will be described below, which are input to U1 signal lines PA0 and PA1 over the M-data and M-clock lines. These special commands are "trapped" by U1 and do not reach the actual keyboard device connected to the keyboard port J601. Microcontroller U1 responds immediately to these special commands by executing stored instructions such as, for example, setting or clearing digital output lines, immediately reading digital input lines, carrying out special pulse-width measurements on PA4, or initiating an interval of pulse counting on PA5. The values from such measurements are put into a register in U1 apart from the register which is used to hold the ASCII character string representation of the digitized voltage values. The measurement values are sent directly to the host CPU through PA0 and PA1, using a condensed binary format rather than using MACINTOSH key codes. The binary format representation results in a significant compression of the data. More specifically, the use of key codes requires two response bytes for each text character, i.e., one byte for key down and one byte for key up, while the condensed binary format allows for the sending of a number of bytes of digital information, which is sufficient to respond to most of the special commands Each special enhanced mode command has a varying number of bytes which it expects in response. Special driver software is used in the PC which "patches" or alters the interrupt vector of the MACINTOSH keyboard driver software so that it traps incoming response codes, converts them into a format useable by the calling software program (e.g., the application program or desk accessory being used on the PC), and returns those values to the calling program. Typically, the calling program could be written in a high level language such as Basic or Pascal. The calling program could also be a database program such as OMNIS 3-Plus (OMNIS is a trademark of Blyth Software, Inc.), or a Hypertext application program such as Apple Computer's HYPERCARD (a trademark of Apple Computer, Inc.).

The analog-to-digital conversion process will now be described with reference to FIGS. 7, 8, and 9. In the preferred embodiment of the I/O Bridge device 10, a single-slope pulse-width conversion circuit 250 (FIG. 7) is used with certain enhancements which provide significant benefits, including higher resolution, greater accuracy, and relatively-fast conversion time.

As shown in FIG. 7, the single-slope pulse-width conversion circuit 250 in the I/O Bridge device 10 consists of a free-running linear ramp generator 275 and a window comparator 300. The window comparator 300 has an enable input (enable A/D in), an analog signal input (upper limit), a ground input (lower limit), an input voltage input (ramp output), and a variable pulse-width output (A/D output).

As illustrated in FIG. 8, the window comparator 300 provides an output (labeled comparator output) which is true (high) only when the input voltage (ramp voltage) is between the lower and upper limit reference voltages. Since the lower limit reference voltage is connected to ground, and the upper limit reference voltage is connected to the A/D input, the width of the comparator's output pulse is directly proportional to the voltage present at the A/D measurement input A/D IN. If the A/D input voltage nears zero volts, the pulse width will approach zero microseconds. If the A/D input voltage nears full scale (+5 volts DC nominal), the pulse width will approach its full-scale value (40,000 microseconds nominal). The use of a three-input window comparator 300 (as opposed to a simple two-input differential comparator) allows the zero crossing of the ramp voltage to be precisely determined, as shown. The use of a free running linear ramp generator 275 allows the circuit to be interfaced with U1 with only one pulse-width input line and no output lines. Since the window comparator 300 will normally provide an output pulse for both rising and falling ramp voltages, a reset output (enable A/D in) is connected from the ramp generator to the window comparator to disable it during the reset period (downward ramp). Thus, the ramp generator can be designed for maximum accuracy and repeatability during the enable period (rising ramp).

Figure 9:
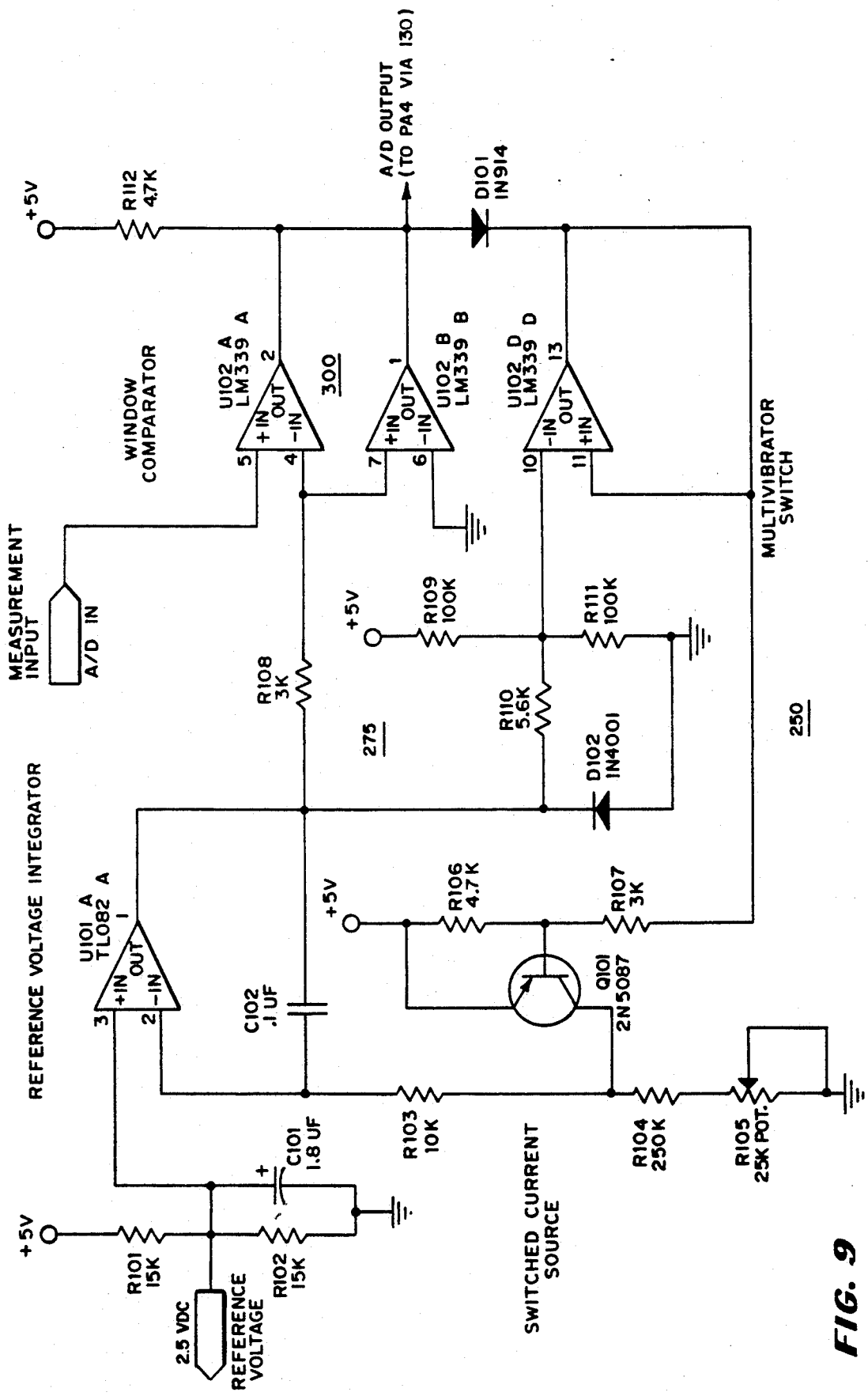
FIG. 9 is a schematic diagram of the circuitry of the single-slope analog-to-pulse-width converter of FIG. 7.

Turning now to FIG. 9, there is shown a detailed schematic diagram of the single-slope pulse-width conversion circuit 250 utilized in the I/O Bridge device 10 of the present invention. The window comparator 300, in this particular embodiment, is implemented with two LM339 comparators, U102A and U102B. The comparator outputs are connected together in a wired-OR fashion and pulled up by a 4.7 kilohm resistor R112. The linear ramp generator 275 is implemented with a TL082

JFET operational amplifier U101A, an LM339 comparator U102D, and a PNP bipolar transistor Q101. The output of the window comparator 300 is disabled during ramp reset by a diode D101. Although only one window comparator 300 is provided in the preferred embodiment, it should be understood that a single linear ramp generator 275 can serve multiple comparators 300 if it is desired to make more than one measurement at a time.

The JFET operational amplifier U101A forms an integrator with a capacitor C102. With such an integrator, given a reference voltage at the non-inverting input (pin 3) of U101A, the output will drive a current through the capacitor C102 which is equal to and opposite from the current at the inverting input (pin 2) from all other sources (neglecting input bias current), so that the inverting input will be held at the same reference voltage. The 2.5 VDC reference voltage is derived from the +5 VDC regulated power supply described above, via resistor R101 and R102.

The switched current source is provided through resistor R103. Whenever PNP bipolar transistor Q101 is biased off, the current through resistor R103 is equal to (2.5 volts / (R103+R104+R105)), or approximately 9.2 microamps. When a constant current is passed through a capacitor in this manner, the voltage across its terminals changes as defined by the formula:

$$\text{change (volts)} = \frac{\text{current (amps)} \times \text{time (seconds)}}{\text{capacitance (farads)}}$$

In the preferred embodiment, this calculates to 9.2 microamps times 40,000 microseconds divided by 0.1 microfarads, equaling a 3.68 VDC input range. The analog input conditioning circuit, described below, will attenuate the input signals to match the 3.68 volt A/D converter full scale input.

When the ramp voltage exceeds an upper limit set by comparator U102D, that comparator's output changes state (goes low), turning PNP bipolar transistor Q101 on via resistor R107, causing a larger current (about 300 microamps) to flow in the opposite direction through resistor R103, and causing the op-amp U101A to discharge capacitor C102 in about 1200 microseconds. When the ramp voltage is returned to a lower limit set by comparator U102D, the comparator changes state again (goes to open collector), repeating the measurement cycle. Since the comparator U102D has 100% positive feedback from its output to its non-inverting input, the lower limit is ground, and the upper limit is the positive supply. An attenuator (voltage divider), consisting of resistors R109, R110, and R111, allows the actual ramp voltage to slightly exceed these limits, so that the circuit is well stabilized in its linear mode during an actual measurement cycle (during the window comparator's true output pulse).

Resistor R106, connected across the base-emitter junction of the PNP bipolar transistor Q101, reduces the effect of any leakage current from comparator U102D's output during the measurement cycle. Leakage current through PNP bipolar transistor Q101, when it is biased off, is typically 10 nanoamps or less at room temperature, thus introducing an error of less than 0.10% in the current through resistor R103 during the measurement cycle. Power supply noise and ripple is also effectively isolated from the current source by PNP bipolar transistor Q101 during the measurement cycle.

Diode D102 and resistor R108 prevent a latch-up condition, which could occur when power is supplied to the circuit. Resistor R105 is an adjustable potentiometer which provides a convenient adjustment for the full scale value of the A/D converter. The resistor R105 can be used to compensate for variations in the value of integration capacitor C102 and in the value of voltage reference resistors R101 and R102. No zero adjustment is provided in this embodiment, since the zero-crossing detection feature of the A/D converter reduces zero errors to only the voltage offset of the window comparator 300, i.e., typically 2 millivolts or less.

Specific software programs, to be described below, have been developed to be executed by the microcontroller U1. These programs are stored in the read only memory U2 which is connected via the CPU BUS 106 to U1. As will be seen below, the software has been developed to maximize the effectiveness of the I/O Bridge device by cooperating closely with its hardware. Several novel features will be described, with particular reference to the A/D converter, which would not have been possible without such close coupling between hardware and software.

In the normal mode of operation, i.e., keyboard emulation mode, no new software is needed for the desktop CPU. The I/O Bridge device 10 will input measurement values (after modification thereof) directly into spreadsheets, word processing documents, database screens, statistical analysis programs, or programs written in higher level languages such as Basic and Pascal. In each case, the effect on the PC application program is just as if the user had typed the measurement values on the keyboard, followed by an appropriate delimiter.

In the enhanced mode of operation, it was necessary to write special software drivers for the various types of MACINTOSH computers used to communicate with the I/O Bridge device 10. Most of the drivers have been created by writing external commands and functions using Apple Computer's objection-oriented authoring environment, the HYPERCARD program. These external code segments may be linked to HYPERCARD documents (commonly called stacks) and may be called by name from the HYPERCARD scripting language, Hypertalk. When called, the external code segments will either patch (as in the case where the MACINTOSH PLUS is used) or bypass (as in the case where the APPLE DESKTOP BUS interface is used with a MACINTOSH II) the existing keyboard drivers, thereby communicating directly with I/O Bridge devices connected to the computer's keyboard interface port. The code segments are written to be as transparent as possible, so as not to disable or confuse the keyboard, which is, as described above, connected in line with such devices.

It is to be noted that the versatility of the I/O Bridge device 10 can be greatly increased by providing "desk accessories" for the device. One such accessory program has been written to read from and write to the various registers of the I/O Bridge device, and to send trigger commands to the I/O Bridge device at specific time intervals. Such a desk accessory is useful in situations where it is desired to take measurements at specific intervals over long periods of time when the measurement equipment is unattended. For instance, if a spreadsheet program is being used on the PC while the trigger commands are being sent, measured values will be "typed" into the spreadsheet at regular intervals, even if no operator is present. Further enhancements to the desk accessories may also be made to allow a variety of data collection and storage functions to be performed while the user is simultaneously running a completely different application program on the same computer.

As illustrated in FIG. 13, the digital input and output registers, 160 and 165, are connected to U1 by the PIA BUS, a bidirectional data bus. The PIA bus will now be described in detail, since it is used in several different modes. A bidirectional data line typically consists of a single line pulled up to a positive supply voltage through one or more pull-up resistors. The logic state of this line can be sensed by any and all devices connected to the line, and can be changed, i.e., pulled low, by any or all of the devices. Data transmitted on the line by any device can be sensed by any other device. The direction in which the data flows over the bidirectional data bus line is determined by which device has requested access of the line. If two devices are requesting access to the same line simultaneously, malfunctions (data collisions) can occur.

In the case of the digital interface registers 160 and 165 described above, four bidirectional lines are used along with four control lines to prevent such malfunctions. When the I/O Bridge device 10 is used with the MACINTOSH PLUS keyboard interface (FIG. 5), the host CPU always initiates a command first, and the command is always followed by a keyboard's response. Since each device waits for the other, collisions are prevented in this manner. Conversely, when the I/O Bridge device 10 is used with the APPLE DESKTOP BUS, the host CPU generates a command first, and then waits for further input from the various input devices. In this case, each input device is given a unique address by the CPU to prevent collisions.

FIG. 16 is a program flow diagram which sets forth the series of steps performed by the single-slope A/D conversion circuit 250 (FIGS. 7, 8, and 9) utilized in the I/O Bridge device 10 of the present invention. The steps may be described as follows:

Step 1. An analog input to be converted is first selected by the analog input selector 120 (FIG. 4C and FIG. 11), and is then directed to the A/D input of the window comparator 300.

Step 2. The question is asked whether the comparator output is false. If not, then the program loops back and continues to monitor the A/D input until the comparator output goes false. There is a possibility that, during the time that the comparator is not false, a timeout will occur at Step 2A.

Step 2A. The occurrence of a timeout will indicate that the A/D input voltage is above the predetermined range which is acceptable.

Step 3. If the answer to the comparator false question is yes, the program questions whether the comparator output is true. Once again, if the answer to this question is no, the program loops back and continues waiting until the comparator output is true.

Step 3A. Here again, a timeout may occur during the waiting period when the comparator is false, indicating that the A/D input voltage is below the predetermined acceptable range.

Step 4. Once an input is obtained wherein the comparator output goes true, the program starts a 40,000-microsecond countdown timer.

Step 5. Immediately thereafter, the program again questions whether the comparator output is false. If not, the program loops back again as many times as necessary waiting for a comparator false output.

Step 5A. During the waiting period when the comparator output remains true, a timeout may take place which will indicate that the A/D input is above the predetermined voltage range.

Step 6. Once the comparator output goes false, the timer is stopped and read.

Step 7. The elapsed time that is read from the timer is divided by eight (see below) to provide a conversion into millivolts. The converted value, in millivolts, is then saved in scratch pad RAM 114 for further processing.

In other words, FIG. 16 sets forth an algorithm which is used by U1 to convert the pulse-width output of the window comparator 300 into a digital representation of the measured voltage. First, an analog input is selected using the analog input selector 120. Microcontroller U1 then waits for the output of comparator 300 to go false. This prevents U1 from starting to time a pulse in the middle of an A/D conversion cycle. If U1 times out during this waiting time period, the true pulse lasted longer than expected and the A/D input voltage is above the nominal range. Microcontroller U1 then waits for the comparator output to go true, indicating the point at which the linear ramp crosses zero volts. If microcontroller U1 times out during this waiting time period, the window comparator 300 is being held false by an A/D input below the nominal range, i.e., below zero.

As soon as a zero crossing is indicated, a countdown timer, set for 40,000 microseconds, is started. This particular time interval has been chosen for the algorithm for two reasons. First, it utilizes most of the resolution available in a 16-bit counter/timer, with the maximum number of counts being 65,535. Second, because the binary result can be easily divided by four (rotated 2 bits to the right) to give a range of zero to ten volts in one millivolt increments or, on the other hand, may be divided by eight (rotated 3 bits to the right) to give a range of zero to five volts in one millivolt increments. Microcontroller U1 then waits for the comparator output to go false again. If this takes longer than expected, the A/D input voltage is assumed to be above the nominal range. Otherwise, the value in the counter/timer is read and divided (by 4 or by 8) to get a binary integer showing the number of millivolts above zero present at the A/D input.

Figure 17A:
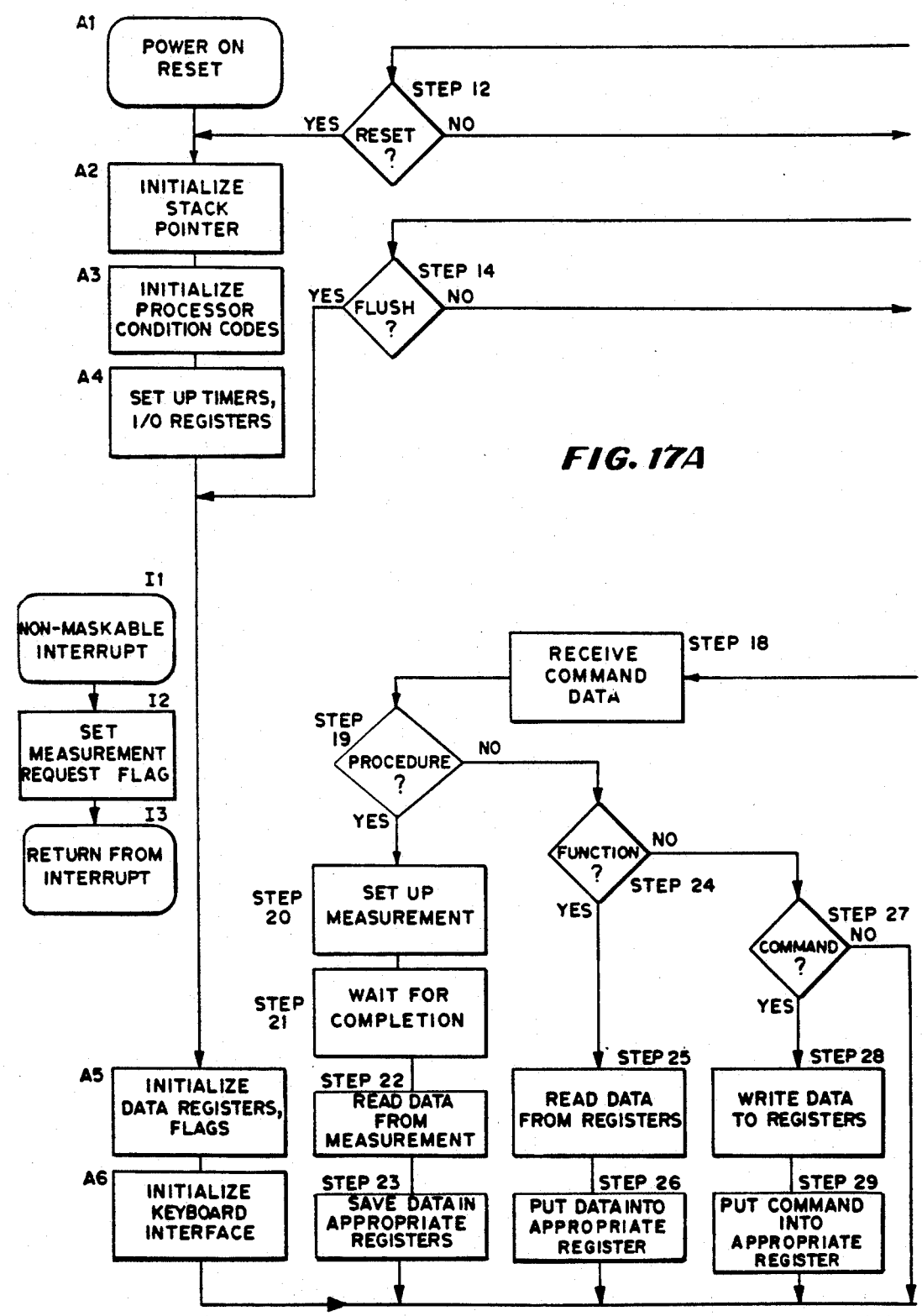
FIGS. 17A-17B set forth a program flow diagram of the steps carried out by the microcontroller of the device during a complete cycle of processing information received when the information is to be converted and transmitted to a host CPU via an APPLE DESKTOP BUS.
Figure 17B:
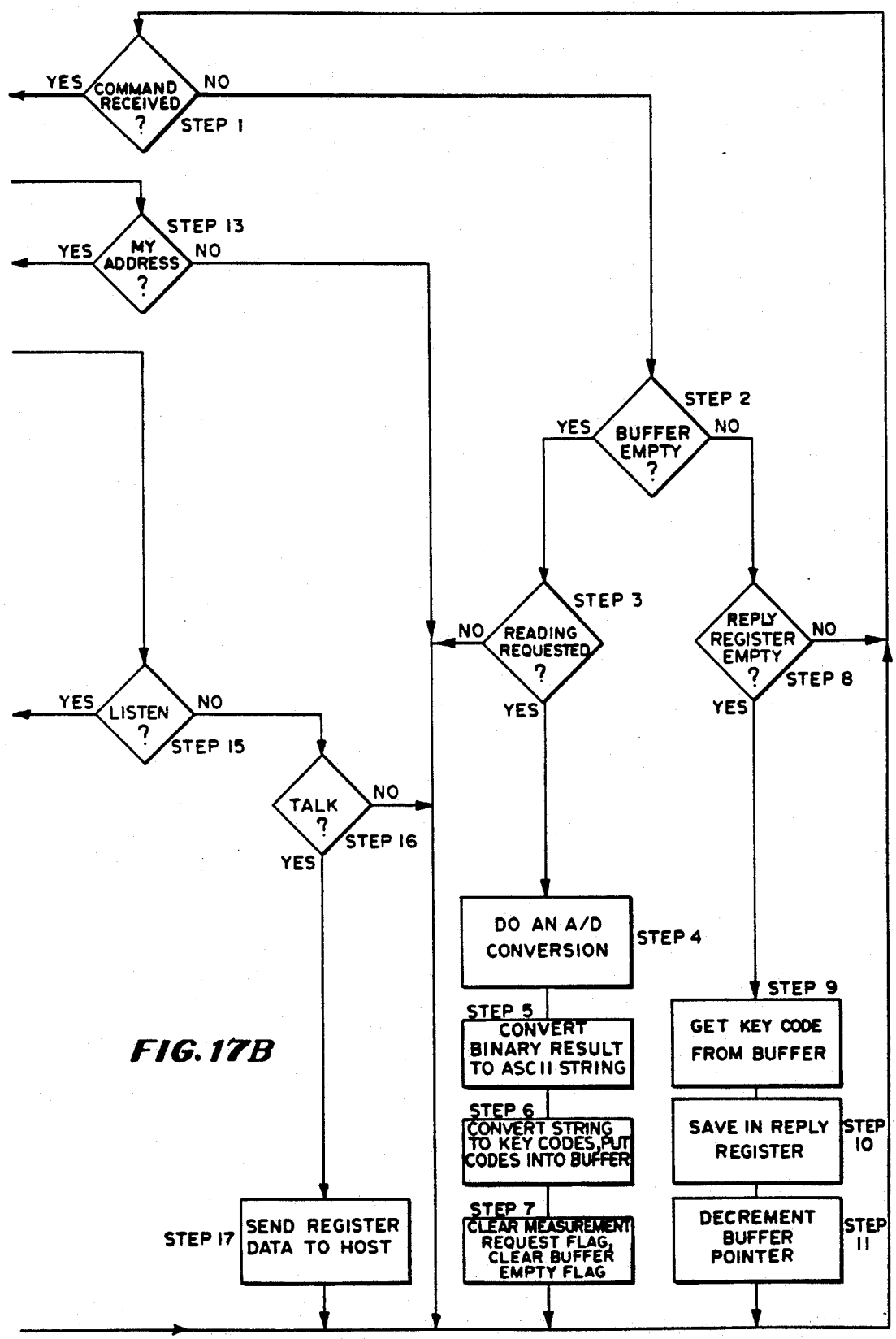

Referring now to FIGS. 17A-17B, a flowchart is set forth which describes the program steps which are programmed into the ROM U2 of the I/O Bridge device 10 when used with a MACINTOSH II desktop computer having an APPLE DESKTOP BUS. The flowchart includes several steps, each of which can be described as follows:

Step 1. The program of microcontroller U1 of the I/O Bridge device first questions whether a command has been received from the host CPU. If the answer to this question is no, the program proceeds to Step 2.

Step 2. The program next questions whether a particular scratchpad RAM register of U1, designated as the key code buffer, is empty. If the answer is yes, the program moves on to Step 3.

Step 3. The program next questions whether an analog input reading has been requested (via measurement request flag set by interrupt Step I2, below). If no reading has been requested, the program loops back around to Step 1. If, on the other hand, the answer is yes, the program proceeds to Step 4.

Step 4. If a reading has been requested, then the analog input is converted to digital form by A/D conversion, as described in conjunction with FIG. 16. The program then proceeds to Step 5.

Step 5. The converted digital reading, a binary result, is translated into an ASCII character string, in a manner which will be described in conjunction with FIG. 19. The program then proceeds to Step 6.

Step 6. The string of ASCII characters is then converted into key codes which are acceptable to the CPU of the host computer incorporating the APPLE DESKTOP BUS (ADB). These key codes are stored in the key code buffer, and the program then proceeds to Step 7.

Step 7. In this step, the measurement request flag (set by interrupt Step 12, below) is cleared, and the buffer empty flag (see Step 11, below) is cleared. At this point, the program flow returns to Step 1, described above.

Returning now to Step 2, if the key code buffer was not empty, the program proceeds to Step 8 instead of Step 3.

Step 8. Here, the program questions whether the reply register (in the scratchpad RAM of the device 10) is empty. If the answer is no, the program loops back around to Step 1, described above. If, on the other hand, the answer is yes, the program proceeds to Step 9.

Step 9. In this step, the program obtains a key code from the key code buffer.

Step 10. The key code which has just been obtained from the buffer is now saved in the reply register.

Step 11. At this point, the program decrements the buffer pointer (and sets a buffer empty flag when the key code buffer is empty). Once this has been accomplished, the program again returns to Step 1.

Returning now to Step 1, when a command has been received from the host CPU, the program proceeds to Step 12 instead of Step 2.

Step 12. The program asks whether a reset has been requested. If the answer is yes, the program begins a reset procedure (Step A2, below) similar to the powerup reset procedure described below. If no reset was requested, the program proceeds to Step 13.

Step 13. At this step, the program asks whether the address of the particular I/O Bridge device 10 has been requested on the ADB. If the answer is no, the program loops back around to Step 1. If, on the other hand, the answer is yes, the program continues with Step 14.

Step 14. The program then asks whether a flush command (i.e., a command to re-initialize the registers) was requested. If the answer is yes, the program proceeds to the latter steps of the power up procedure, to be described below, wherein data registers, flags, and the keyboard interface is initialized. After these tasks have been completed, the program returns to Step 1. If, on the other hand, a flush was not requested, the program continues with Step 15.

Step 15. The program asks whether the I/O Bridge device should listen, i.e., read data from the ADB (as opposed to writing data onto the bus). If the answer to this question is no, the program proceeds to Step 16.

Step 16. Here, the program questions whether the I/O Bridge device is to talk, i.e., write data onto the ADB (as opposed to read data from the bus). If the answer is no, then the program returns to Step 1. If, on the other hand, the answer is yes, the program proceeds (in the normal mode) to Step 17.

Step 17. Here, the program sends the register data (from either the key code buffer or the reply register) to the host CPU, in this case, via the ADB. After it has completed sending the data to the host computer, the program loops back to Step 1.

Returning now to Step 15, if the I/O Bridge was requested to listen to the bus, the program proceeds to Step 18 instead of Step 16.

Step 18. At this point, the program receives command data, as will be described below in conjunction with the enhanced mode commands utilized for this procedure. Once the command data has been received, the program continues with Step 19.

Step 19. In this step, the program interprets part of the command data and questions whether a procedure (as opposed to a function or command, as described below) is to take place, e.g., the procedure of performing a desired measurement. If the answer to this question is yes, then the program proceeds to Step 20.

Step 20. Here, the program sets up the desired measurement and proceeds to Step 21.

Step 21. The program now waits for completion of the measurement, and then proceeds to Step 22.

Step 22. The program then reads the data obtained from the measurement, and proceeds to Step 23.

Step 23. The program then saves the measurement data in the appropriate registers. Once the data has been accumulated and saved to the registers, the program once again returns to Step 1.

Referring back to Step 19, if a procedure is not requested, the program continues with Step 24 rather than Step 20.

Step 24. The program again interprets the command data and questions whether a function is to be performed, i.e., output data to the host CPU. If the answer is yes, the program moves on to Step 25.

Step 25. Here, the requested data from the appropriate registers is read by the program.

Step 26. Now the requested data is placed into the appropriate register to be read by the host CPU. Once this data has been placed into the register, the program again returns to Step 1.

If, at Step 24, a function has not been requested, the program proceeds to Step 27 instead of Step 25.

Step 27. At the this point, the program again interprets the command data and questions whether a command to the I/O Bridge device is to be performed, i.e., an instruction to input data into the I/O Bridge from the host CPU. If the answer is no, the program loops back around to Step 1. Otherwise, the program proceeds to Step 28.

Step 28. At this point, the I/O Bridge command data is written to the appropriate I/O Bridge registers and the command is performed.

Step 29. Here, the program proceeds to place a verification command into the appropriate register for confirmation to the host CPU. After this has been completed, the program again returns to Step 1.

As is common with almost all logic systems, there are always initialization steps which take place within the flow of the program when power is first applied to the circuitry thereof. In this particular case, the initialization program path includes the following Steps A1-A6:

Step A1. The system is powered on and all input and output logic levels are reset, all RAM registers are cleared, etc.

Step A2. Here, the program initializes the microcontroller's memory stack pointer.

Step A3. The condition codes of U1 are initialized at this point.

Step A4. The timers, input registers, and output registers are initialized by the program.

Step A5. The data registers and flags are initialized by the system.

Step A6. The keyboard interface lines are initialized.

Such initialization steps are common to many logic systems and can be accessed, as described below, at other points during the processing of the program. For example, when a flush has been requested at Step 14, then Steps A5 and A6 are performed and the program returns to Step 1. Also, at Step 12, when a reset has been requested, Steps A2 through A6 are performed and the program once again returns to Step 1.

It should be noted that a non-maskable interrupt (NMI) can be generated at any time during the flow of the program. This non-maskable interrupt is shown in FIG. 17A as a subroutine, and includes the following three Steps I1-I3:

Step I1. This is the receipt of an instruction that a non-maskable interrupt has taken place. At this point, the program proceeds to Step I2.

Step I2. A measurement request flag is set (see Step 3 above). Once the request flag is set, the subroutine proceeds to Step I3.

Step I3. The program returns control from the interrupt subroutine. This NMI procedure has also been described above.

Figure 18B:
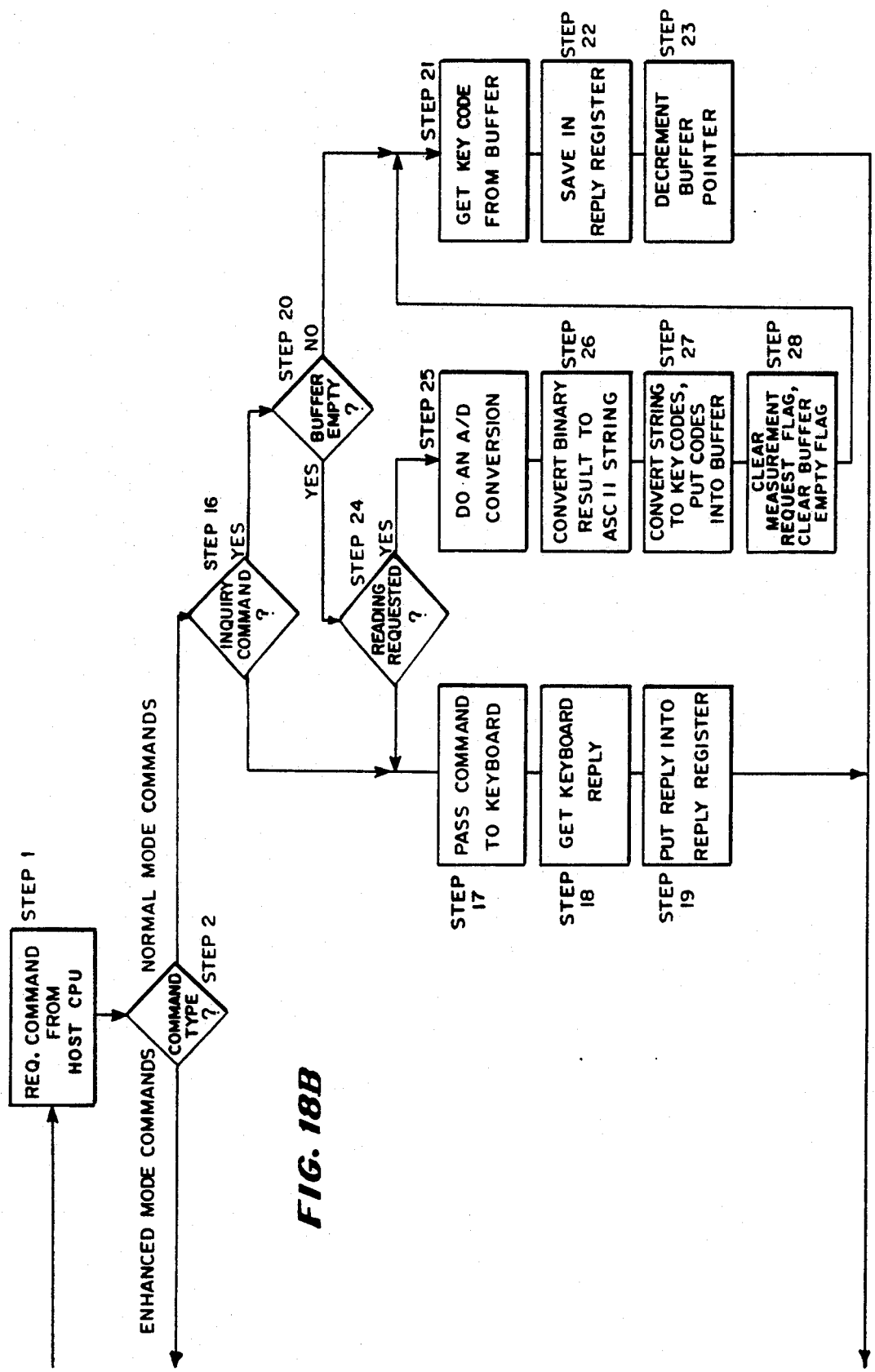

Referring now to FIGS. 18A-18B, a flowchart is illustrated describing the program steps which take place within U1 when the I/O Bridge device 10 of the present invention is utilized with a MACINTOSH PLUS computer (i.e., without the APPLE DESKTOP BUS). As can be seen from the figure, many of the steps here are similar to, if not identical to, the steps set forth in FIGS. 17A-17B. For example, the power-up sequence which was described in conjunction with Steps A1 through A6 is identical, and therefore will not be described again. Furthermore, the subroutine for the non-maskable interrupt (NMI) is identical to that described in FIG. 17A, so the description will not be repeated.

The steps within the main program flowchart, however, are somewhat different, and can be described as follows:

Step 1. The microcontroller U1 first receives a command from the host CPU (MACINTOSH PLUS) requesting information as described above.

Step 2. Once a command has been received, the program first identifies the type of command. In this respect, if the command is an enhanced mode command, as will be further described below, one distinct set of program steps is followed. On the other hand, if the command received is a normal mode command, then a second distinct set of steps is followed. Proceeding first through the program steps when an enhanced mode command is received, the program proceeds to Step 3.

Step 3. The program questions whether a procedure has been requested. If so, the program proceeds to Step 4.

Step 4. The program sets up the requested procedure.

Step 5. In Step 5, the program waits for completion of the measurement.

Step 6. Here, the measurement data is read.

Step 7. The measurement data is saved to the appropriate register, which, in this case, is the reply register. At this point, the program proceeds to Step 8, which is accessed upon several occasions within the program flow.

Step 8. A reply (e.g., requested data or status information) is sent back to the host CPU. At this point, the program returns to Step 1.

Returning now to Step 3, if a procedure has not been requested, the program proceeds to Step 9 instead of Step 4.

Step 9. The program questions whether a function has been requested. If the answer is yes, the program proceeds to Step 10.

Step 10. The program reads the desired data from the appropriate registers.

Step 11. The data that has been read is placed into the reply register. Once this data has been placed into the register, the program proceeds with Step 8, sending a reply to the host CPU and then returning to Step 1.

Returning now to Step 9, if a function was not requested, then the program proceeds to Step 12.

Step 12. The program inquires as to whether a command to the I/O Bridge device has been received. If the answer to this question is no, the program proceeds to Step 13.

Step 13. A null reply is placed into the reply register. The program then proceeds with Step 8, where the null reply is sent to the host CPU, and the program returns to Step 1.

If, at Step 12, a command was requested, then the program proceeds with Step 14 instead of Step 13.

Step 14. At this point, the program writes the command data into the appropriate registers of the I/O Bridge device.

Step 15. The program places a command reply into the reply register, and proceeds to Step 8, where the reply is sent to the host CPU.

When the command type at Step 2 is found to be a normal mode command, the program proceeds with Step 16 as follows:

Step 16. Once the command type has been determined to be a normal mode command at Step 2, the program questions whether or not the normal mode command is an inquiry command (requesting keystroke information from the keyboard). If the answer to this question is no, then the program continues with Step 17.

Step 17. The non-inquiry command from the host CPU is passed on to the keyboard.

Step 18. At this point, the program elicits a keyboard reply (e.g., type of keyboard).

Step 19. The program then places the keyboard reply into the reply register, and returns to Step 8, where the reply is sent back to the host CPU. The program then returns once again to Step 1.

Returning now to Step 16, if an inquiry command has been received, then the program proceeds to Step 20.

Step 20. At this point, the program questions whether the key code buffer of the RAM is empty. If the answer is no, then the program proceeds to Step 21.

Step 21. At this point, the microcontroller obtains a key code from the buffer.

Step 22. This key code is saved to the reply register.

Step 23. The key code buffer pointer is decremented (and a buffer empty flag is set when the key code buffer is empty). Then the key code saved in the reply register is sent to the host CPU in Step 8. Once again, the program returns to Step 1.

If, at Step 20, the key code buffer was empty, then the program proceeds to Step 24.

Step 24. Here, the program questions whether a reading has been requested (via interrupt Step I2). If no reading has been requested, then the program proceeds to Steps 17-19, passing a command to the keyboard, receiving a keyboard reply, and placing the reply into the reply register. The program then proceeds to Step 8, sending the keyboard reply back to the host CPU, and returning to Step 1.

If, on the other hand, a measurement reading is requested at Step 24, the program proceeds to Step 25.

Step 25. At this point, an analog input reading is converted to binary form via A/D conversion.

Step 26. Here, the binary result of the A/D conversion is translated into an ASCII character string.

Step 27. The ASCII character string is converted into key codes, and the key codes placed into the key code buffer.

Step 28. At this point, the measurement request flag and the buffer empty flag are cleared. The program then loops back through Steps 21-23, proceeding to get the key code from the buffer, saving it in the reply register, and decrementing the buffer pointer. After these procedures take place, the program again proceeds to Step 8, where the reply is sent to the host CPU. The program then returns to Step 1.

FIG. 19 sets forth a flowchart of a binary integer-to-decimal string conversion algorithm. In this algorithm, the acronyms utilized are defined and/or initialized as follows:

CHR = An ASCII text character
HEX = The 16-bit binary value to be converted
BCD = 0 (16-bit binary coded decimal result)
CMP = 1000 (decimal compare value)
ADD = $1000 (hexadecimal add value)
STR = ""(ASCII text string result)

The program steps of FIG. 19 may be described as follows:

Step 1. The question is asked whether HEX (the 16-bit binary value to be converted) is less than CMP (the decimal value of 1000). If HEX is less than CMP, then the algorithm proceeds to Step 2.

Step 2. CMP is subtracted from HEX through 16-bit binary subtraction, and the result is saved as a new value of HEX. The algorithm then proceeds to Step 3.

Step 3. BCD (initially equal to 0) is set equal to BCD+ADD (the hexadecimal add value initially equal to $1000) through 16-bit binary coded decimal addition. At this point, the program returns to Step 1, where it is once again asked if HEX is less than CMP.

If, at Step 1, HEX is less than CMP, the program proceeds to Step 4.

Step 4. The question is asked whether CMP equals 1. If not, the program continues with Step 5.

Step 5. CMP is divided by decimal 10 through a 16-bit binary division process. The program then proceeds to Step 6.

Step 6. At this point, ADD (the hexadecimal add value initially equal to $1000) is divided by $10 (Hex 10), i.e., the ADD value is rotated 4 bits to the right. At this point, the program loops back around to Step 1, and once again the question is asked whether HEX is less than CMP.

Returning now to Step 4, if CMP is equal to 1, then the program proceeds to Step 7.

Step 7. Here, the COUNT variable (for counting BCD digits) is set equal to 4, since 4 BCD digits represent 16 bits.

Step 8. CHR (the first ASCII character) is then set to equal the high order digit of BCD added to the ASCII text value for "0".

Step 9. The text string result STR is now set equal to the previous text string result and CHR. In other words, a string concatenation is performed. The program then continues with Step 10.

Step 10. The COUNT id decremented and the 16-bit BCD value is multiplied by $10 (Hex 10). In other words, the result is rotated 4 bits to the left.

Step 11. At this point, the program asks whether COUNT is equal to zero. If not, then the program repeats Steps 8 through 11 until all four BCD digits were used.

Step 12. The binary integer-to-decimal string conversion is completed.

FIG. 14 is a detailed schematic diagram of the interface circuitry 110 utilized to connect the I/O Bridge device 10 to the APPLE DESKTOP BUS (ADB). The ADB has a single bidirectional data line 412 which is connected to all configured devices. The I/O Bridge device 10 monitors the state of this line through PIA BUS line PA0. When the particular I/O Bridge device is addressed to "talk," it uses Q1001 to impress information onto data line 412 connected to the ADB. Transistor Q1001 is controlled by PIA BUS line PA1, through resistor R1001. These are the only components needed to make the ADB interface operational.

If desired, transistors Q1002 and Q1003 form a pulse-width stretching circuit with capacitor C1001, which lights indicator LED D1001 when the I/O Bridge device is sending data to the host CPU. When PA1 is driven high by U1, transistor Q1001 is biased on, pulling the ADB data line 412 low. Transistor Q1002 is also biased on, charging capacitor C1001 rapidly through R1003, which turns on Q1003 and illuminates the LED D100. When PA1 returns low, C1001 then discharges slowly through resistors R1004, R1005, and the base of transistor Q1003, causing current to continue to flow through the LED D1001. The pulse stretching circuit is often necessary, since data transmissions are usually too short to be easily seen as an indicator lamp activation.

Transistors Q1004 and Q1005 form a time delay circuit used to operate a reed relay which disconnects the ADB data line 412 from the I/O Bridge device 10 if the I/O Bridge is not powered. This may be an important feature, since a non-powered device 10 could pull the data line 412 low (through input protection clamping diode D601) causing the ADB to hang. When PA0 is high (as when the I/O Bridge is powered up), Q1004 is biased off allowing C1002 to be charged through diode D1002 and R1009. This, in turn, biases Q1005 on, activating the reed relay 420 and connecting the I/O Bridge device 10 to the ADB. If PA0 is low (as when the device 10 is powered down), Q1004 will be biased on, which will reverse bias D1002 and prevent C1002 from being charged. Q1005 will then be biased off, opening the reed relay and disconnecting the ADB. Normal data communications will cause the PA0 line to change state repeatedly. C1002, however, holds its charge over such interruptions, keeping the reed relay closed and maintaining continuity with the ADB data line 412.

Special commands, as stated above, are required when the device 10 is operating in the enhanced mode. These commands include the following:

Command 0 (Set Measurement Request Flag): Reads analog voltage at analog input channel 0, converts it to a keystroke sequence (X.XXX) and a field delimiter (tab), and sends it to a MACINTOSH keyboard driver. The input range is 0.000 to 5.000 VDC in 1 millivolt steps (1 in 5000 resolution). Above 5.000 VDC reads "over". Below 0.000 VDC reads "under". This command is used primarily by a desk accessory for automatic data input to application programs (e.g., Excel, etc.) in real time.

Command 1 (Request A/D conversion): Reads an analog voltage at a specified analog input channel (0 to 7), converts it to a binary integer (0 to 40000) for subsequent division by 8 to get millivolts (from 0 to 5000) or by 8000 to get volts (from 0.000 to 5.000). This A/D command provides more significant bits than Command 0. However, if the least significant bits are very noisy, the user must truncate them.

Command 2 (Read digital inputs): Reads the state of 8 digital input lines, and returns them as one 8-bit byte of data. Inputs are LS/TTL compatible (i.e., 0.0–0.4 VDC='0', 2.5–5.0 VDC='1', not exceeding range from 0.0 to 5.0).

Command 3 (Write digital outputs): Writes an 8-bit byte of data to the digital output lines. Outputs are LS/TTL compatible (i.e., 0.0–0.4 VDC='0' sinking 20 mA max., 2.5–5.0 VDC='1' sourcing 1 mA max.).

Command 4 (Write/read delimiter characters): Allows user to set ASCII characters which will be used as field and record delimiters. Note that some ASCII characters cannot be converted to key codes when using Command 0.

Command 5 (Clear Event Counter): Resets the event counter (line PA4) to 0. (Maximum count is 65,535.)

Command 6 (Read Event Counter): Returns a 2-byte integer from 0 to 65,535, showing the number of pulses received by the event counter input PA5. Maximum pulse rate is 500 kHz. There is no minimum pulse rate, but rise and fall times should be 10 microseconds or less.

Command 7 (Set asymmetrical pulse output parameters): Sets PA5 output with two 2-byte integers (total 4 bytes) to independently control pulse high time and low time. The maximum pulse period is 131,070 microseconds (65,535 microseconds high and 65,535 microseconds low). The asymmetrical pulse output is filtered to derive the D/A output voltage, which ranges from approximately 0.0 VDC (at 0% duty cycle) to approximately 5.0 VDC (at 100% duty cycle).

Command 8 (Read pulse width on PA4): This command will read pulse widths from 0 to 65,535 microseconds on PA4. It returns the value as a 2-byte integer.

Command 9 (Read clocked pulse width on PA4): Used with the weather station interface (described below) to read anemometer rate of rotation. It returns a 4-byte integer containing the number of microseconds for one revolution. Four bytes could read up to 4,294,967,295 microseconds (about 71 minutes), but present firmware currently times out at 5 seconds.

Command 10/11 (Read inputs of digital interface multiplexer #1 (Command 10) or #2 (Command 11)): Scans multiplexed digital inputs (see FIG. 23A, below), and returns the result as four 8-bit bytes. The inputs are opto-isolated. Input LEDs need from 10 mA to 20 mA to bias on. Forward voltage will be about 1.5 VDC. Maximum reverse voltage is 5.0 VDC.

Command 12/13 (Write to outputs of digital interface multiplexer #1 (Command 12) or #2 (Command 13)): Writes data bits to relay outputs of the digital interface multiplexer (see FIG. 23B, below). The reed relay contacts (not shown) are rated at 500 mA max, 100 VDC max, 10 watt switched load max.

Figure 22:
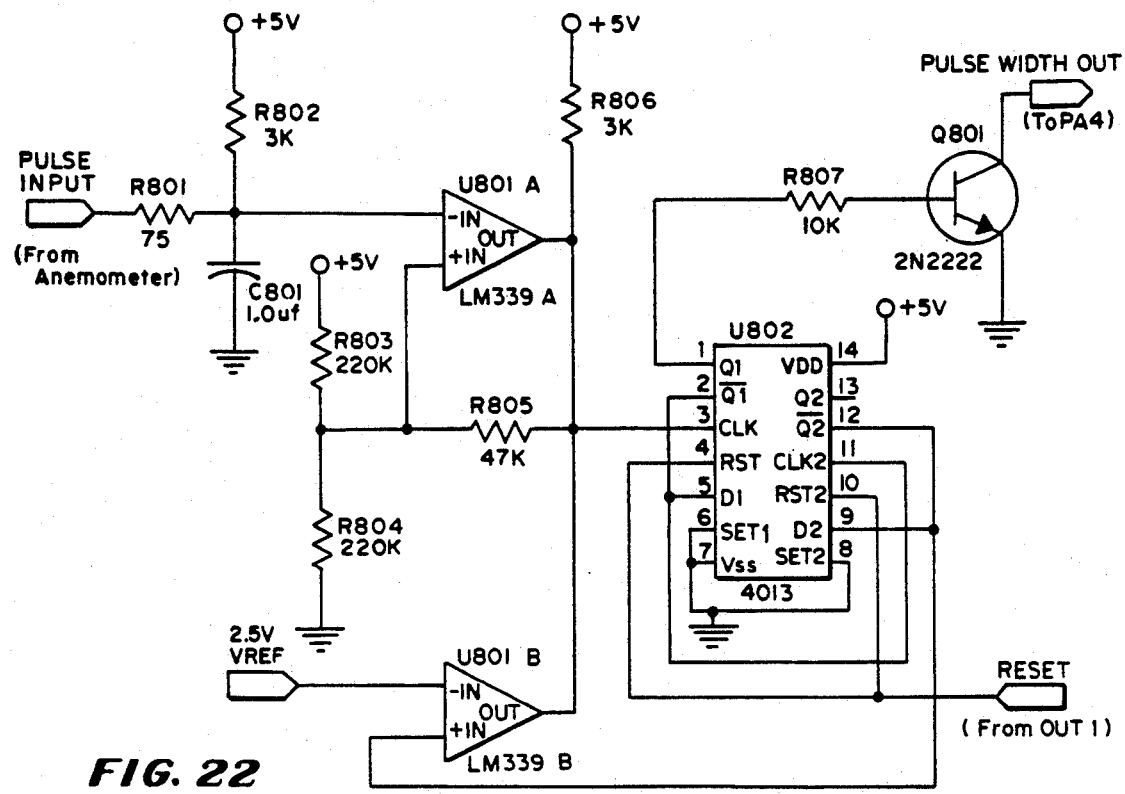
FIG. 22 depicts a schematic diagram of outboard circuitry to permit an anemometer to be connected to the I/O Bridge device.
Figure 21:
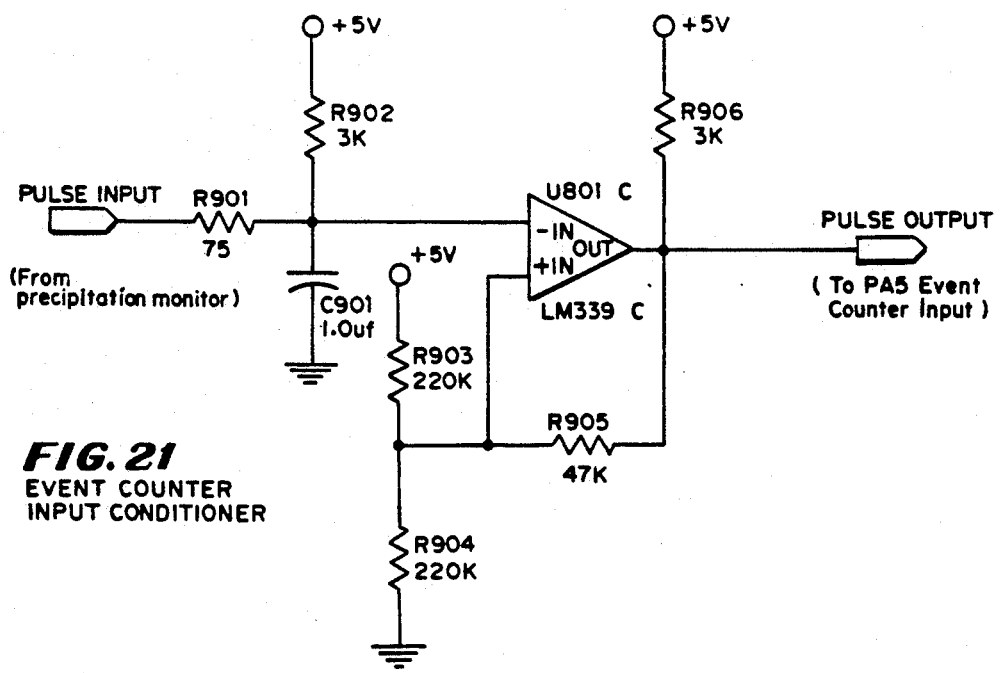
FIG. 21 depicts a schematic diagram of outboard circuitry to permit a precipitation monitoring device to be connected to the I/O Bridge device.

FIGS. 21 and 22 depict the outboard peripheral circuitry for a weather station interface which will allow connection of weather monitoring sensors to the I/O Bridge device 10. FIG. 21 shows a detailed schematic diagram of input conditioning circuitry used to interface a commercially available precipitation monitor to the I/O Bridge event counter input PA5. Integrated circuit U801C is a differential comparator with positive feedback applied by R905. The precipitation monitor provides a pulse signal (switch closure to ground) once for each 0.1 inches of rainfall. The event counter (part of microcontroller U1) may be cleared and read with enhanced mode commands. Data line PA5 may be used as either an event counter input, or as an asymmetrical pulse output, but not both at the same time.

FIG. 22 shows a binary counter circuit specially configured to adapt a commercially available anemometer (wind speed instrument) to the I/O Bridge device 10. The anemometer produces one pulse (switch closure to ground) for each revolution of its vanes. Incoming pulses are waveshaped by U801A (same configuration as FIG. 21) and then applied to the clock input of dual-D flip-flop U802.

Figure 24:
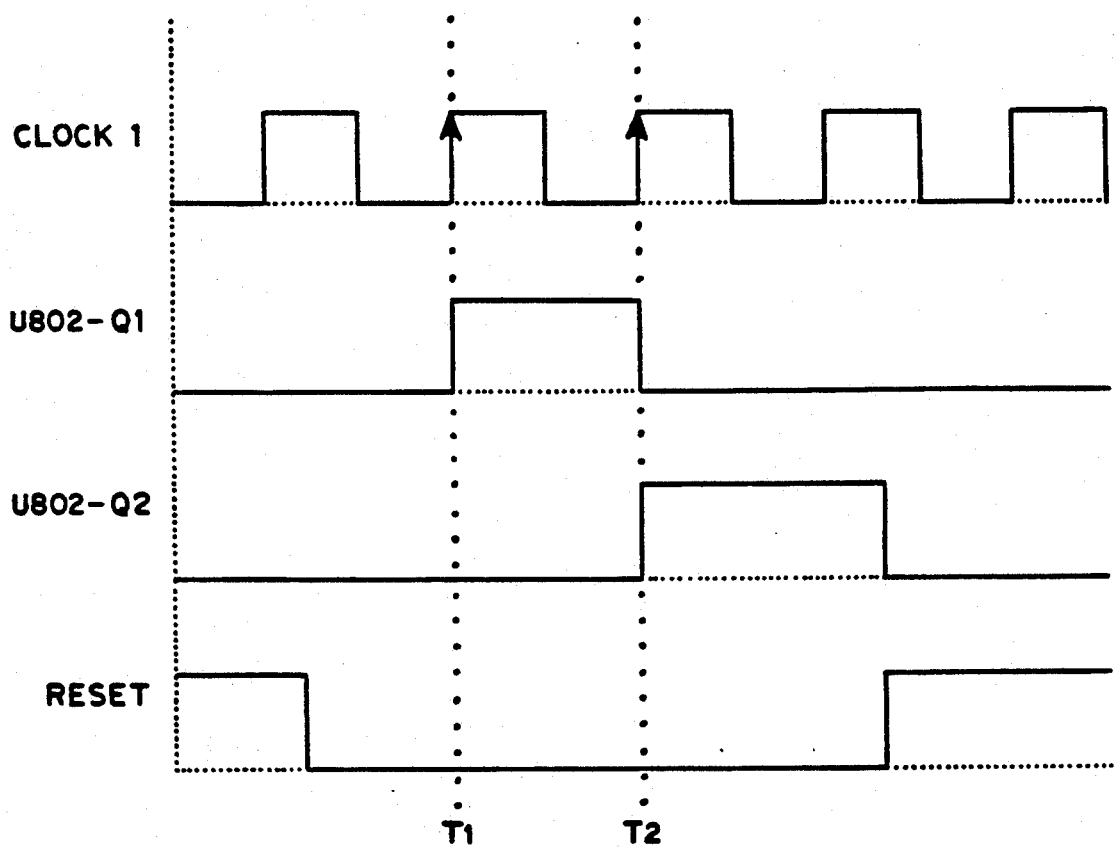
FIG. 24 is a timing diagram of the repetition rate to pulse-width timing of the binary counter circuit of FIG. 22.

As shown in the timing diagram of FIG. 24, the first rising edge of Clock 1 after Reset is released causes the Q1 output of the flip-flop to go true at time T1. This signal is inverted and coupled to PA4 by transistor Q801, and begins a pulse-width timing sequence in microcontroller U1. The next rising edge on Clock 1 at time T2 causes output Q1 to go false, terminating the pulse-width measurement sequence. The output Q2 goes true at the same time, causing U801B's output to go low, inhibiting any further counting until another sequence is started. The pulse width measured by U1 will be equal to the time (in microseconds) required for one revolution of the anemometer. With suitable scaling and offset, this number can be converted into a very precise indication of wind speed. While the microcontroller's basic pulse-width measurement capability is limited to pulses of 65 milliseconds duration or less, it can also be configured to allow counting of timer overflows. In this manner, repetition rates of any duration are accommodated. In the anemometer application, the measurement is typically terminated if pulses are more than ten seconds apart. This corresponds to a zero wind speed.

There may be a need for more than one outboard peripheral device to simultaneously operate with one I/O Bridge device 10. In that case, a digital interface multiplexer 175 shown in FIGS. 23A–23B could be used as an accessory I/O Bridge device to control signals or equipment based on measured values returned by the multiple peripheral devices. It has been determined that the I/O Bridge device 10, as previously described, can support this type of operation, if certain definitions and conventions are observed in using the digital input and output lines.

Figure 23A:
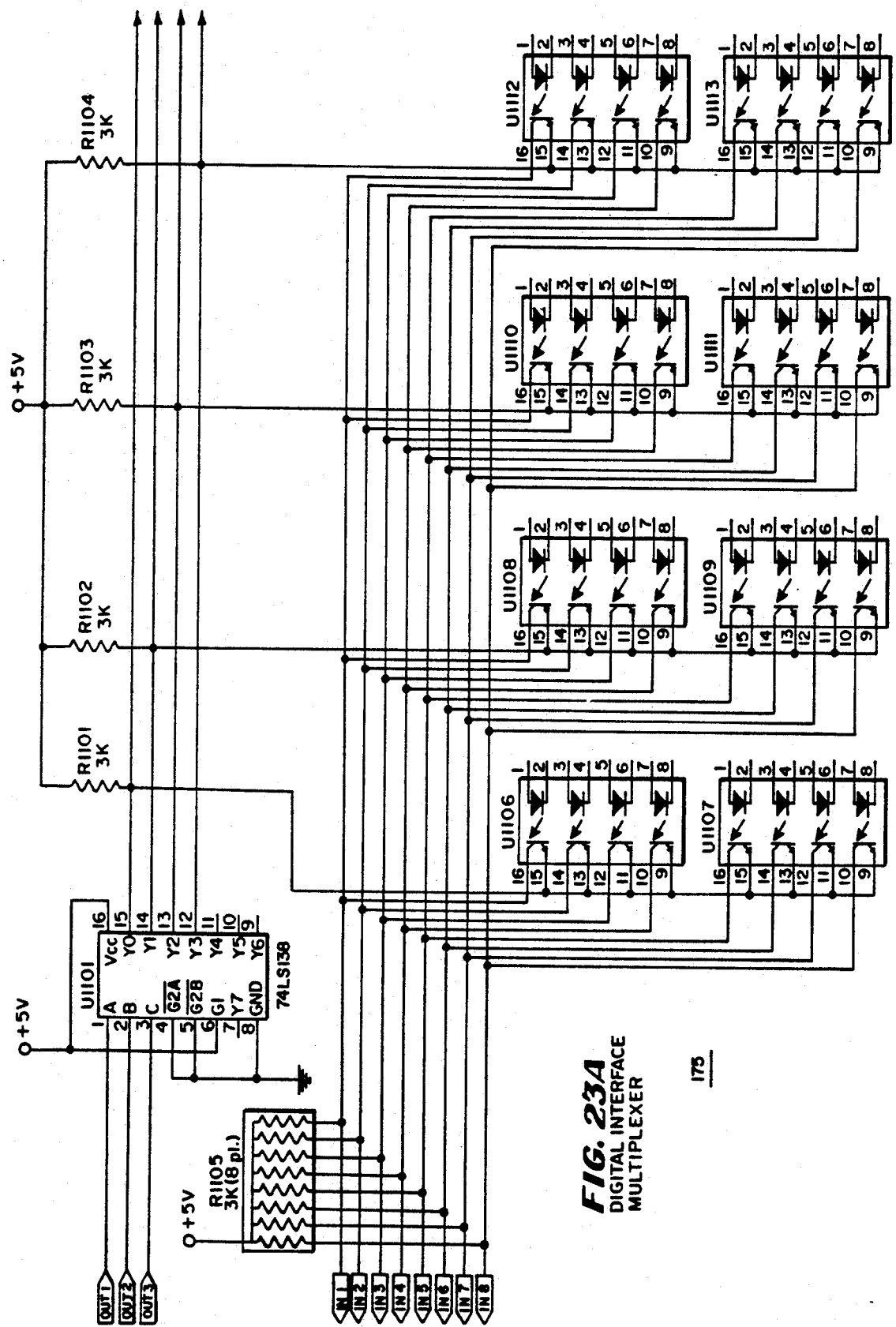
FIGS. 23A-23B depict a schematic diagram of the digital interface multiplexer used with the I/O Bridge device.
Figure 23B:
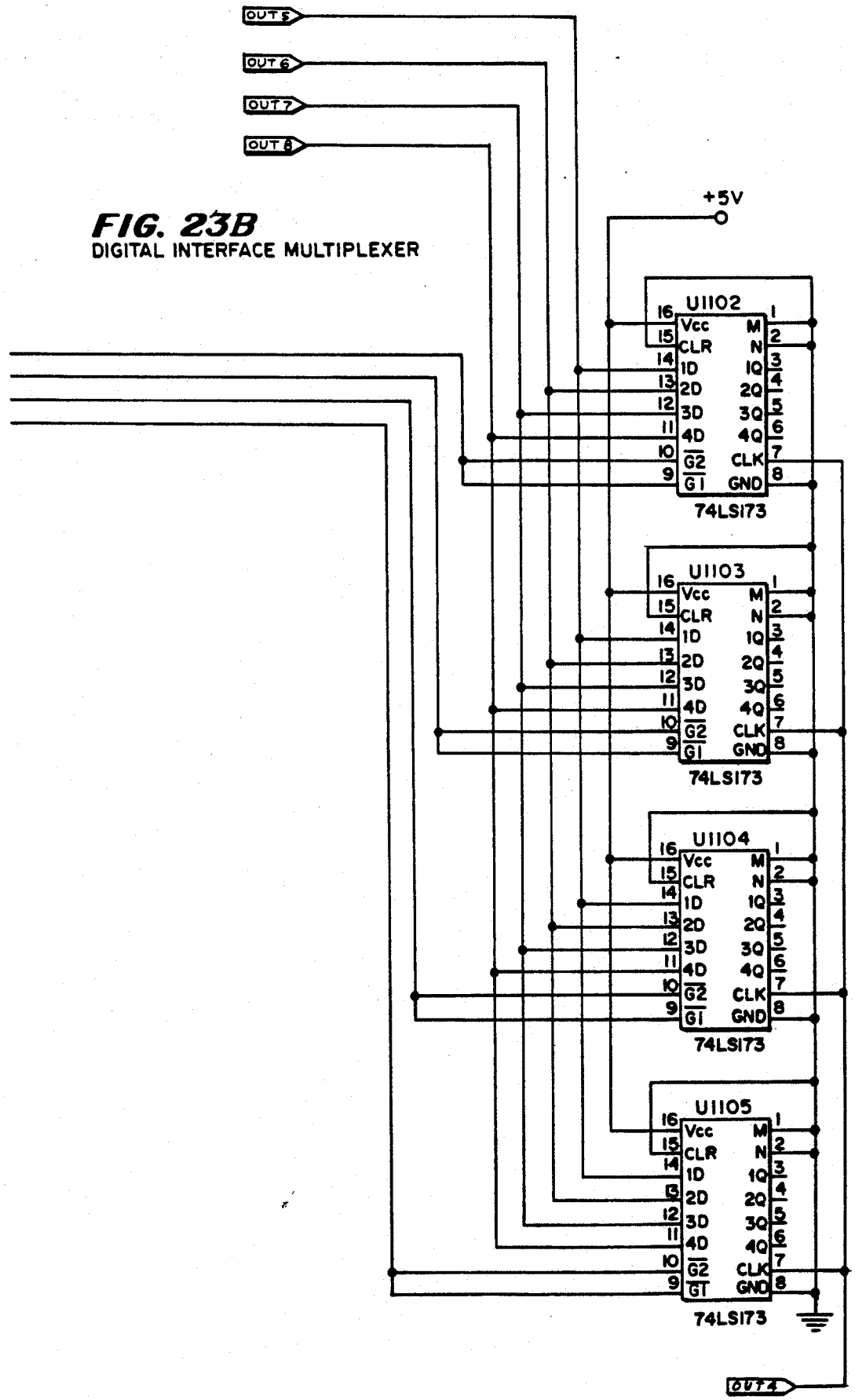

As shown in FIGS. 23A–23B, a protocol for the digital output lines is defined. Output lines OUT1, OUT2, and OUT3 are used as select bits to U1101. Up to eight 74LS173 output latch registers (only four shown, U1102–U1105) can be connected at one time, each enabled by the 74LS138 demultiplexer U1101 using a specific 3-bit code. The inputs (pins 11-14) to the output registers may be connected in parallel as shown, even though they may be located in one or more accessory devices. Output lines OUT5, OUT6, OUT7, and OUT8 are used as a 4-bit data input bus to the output latch registers U1102–U1105. Output line OUT4 is defined as an output strobe. It is raised to a high or true level to clock the output latch registers. Hence, eight external latch registers (only four shown) having 4 latched outputs each (pins 3-6) provides a maximum of 32 latched output lines (using one or more accessory devices 175) per I/O Bridge device 10. For example, if only 8 latched output lines were used in each of two digital interface multiplexers 175, then 16 latched output lines would be provided, leaving 16 additional lines for other devices such as the weather station of FIG. 21 and FIG. 22.

Output lines OUT1, OUT2, and OUT3 are also used as input selectors. These three output lines are set to one of 8 possible states, such that the selected external accessory 175 presents data on the I/O Bridge device's eight input lines IN1-IN8, and then the I/O Bridge device reads the input lines. Up to eight input registers (only four shown, i.e., U1106-7, U1108-9, U1110-11, U1112-13) of 8 bits each (64 bits total) are possible for each I/O Bridge device 10. It is convenient to have eight input bits in each of four registers (as shown) in two multiplexer accessories 175 to utilize all 64 bits.

Hence, the circuit shown in FIGS. 23A-23B expands the I/O Bridge device's effective number of input lines from 8 to 32, and increases the effective number of output lines from 8 to 16. These numbers are somewhat arbitrary, since this technique can be expanded to allow even more inputs and outputs, e.g., as many as 64 input lines and 32 output lines per I/O Bridge device. This additional capacity makes the I/O Bridge device 10 suitable for use in the field of process monitoring and control, and in numerous security and remote-sensing applications. This additional hardware is accessed by the special enhanced mode functions and commands described above.

It is believed that the hardware and software concepts described herein provide a peripheral data acquisition, monitor, and control device which may be coupled to any computer with a detachable keyboard, including IBM PCs, AT&T PCs, DEC PCs (and their compatible equipment) as well as other available computers and terminals. In providing such a versatile device, with respect to its use with various computers, a broad range of applications can be identified.

Such applications, with the use of specific interfaces, may include, for example, the use of the I/O Bridge device with a weather station module, such weather station being able to read wind direction in the normal mode, and being able to read wind speed, precipitation levels, and indoor/outdoor temperatures in the enhanced mode. It is also possible to provide readings of barometric pressure, relative humidity, and solar radiation with the provision of further module devices.

Another application is in the development of a home security system which could provide a user with multiple alarm input loops and multiple alarm outputs. These functions could be controlled with the I/O Bridge device being used in the enhanced mode, with the presentation of a sophisticated program (which could be written in a language suitable for use with a particular computer and/or its programming). This home security system would be able to visually present status and alarm information. The user may even be able, under certain conditions, to establish various zone priority levels and particular alarm actions which may depend on, for example, the time of day, or other conditions. Also, a digital interface multiplexer accessory could be used to produce an enhanced security system which would be capable of determining the status of numerous individual sensors in a business or home. This would allow a user to assign any sensor to any zone, and to selectively enable and disable any sensor at any time.

Furthermore, with today's concern for conservation of energy, the I/O Bridge device 10, again with appropriate programming and interfaces, could be utilized to monitor and control commercial or residential energy usage, such as heating and cooling. The I/O Bridge could also be utilized to monitor and control energy uses in many industrial applications, and could further be provided for smaller household applications such as: the control of model train layouts; an electronic breadboard device for educational purposes; controlling audio and video entertainment equipment via a direct connection thereto or through infrared remote control; etc. Hence, the host computer could be utilized with appropriate signal conditioning circuits as a general-purpose digital voltmeter, a strain gauge or equivalent meter to provide a self-recording bathroom scale or postage scale. The I/O Bridge/host computer system could be used with appropriate interfaces to control the timing and watering amounts of lawn and garden sprinkling systems, or even to measure the ballistic velocity of projectiles.

With respect to other industrial applications for the I/O Bridge device 10, such applications could include electronic gauging, statistical quality control, punch press die protection and parts counting, molding machine temperature and pressure tracking, job control and order tracking (via bar codes or other methods of identification), as well as a variety of other process monitoring and control applications.

Business uses might also include audio and video program production via remote and/or computer control of recording and playback equipment, sequencing of visual presentations such as slide shows or computer graphic displays via wired or wireless remote control and, remote keyboard/keypad applications as might be used in computer training or other multi-user environments. The I/O Bridge device 10 might also be utilized to connect a variety of non-keyboard input and identification devices to desktop computers, such as security and bank card readers, bar code readers, radio frequency I.D. tag readers, and optical character recognition devices.

As can now be seen, the I/O Bridge has a wide variety of applications. It can readily be used to record information from a weather station module. It can also be used to control other types of modules by receiving information from the computer through the interface to the control modules. This makes information available to various sources and permits the running of manufacturing process, among other uses.

It has been shown that the I/O Bridge device may have a power source separate from the host computer. However, the I/O Bridge device may also be attached to a battery-powered computer and/or be battery powered itself to make it highly suitable for field uses. Typical field applications would be geological or military uses. A moving vehicle may also be monitored utilizing the portability aspect of the invention. The I/O Bridge device can monitor a vehicle to control its efficiency and emissions.

Another very typical application is that a plurality of I/O Bridge devices 10 may be used with sensors for a sprinkler system, for instance, as a fire prevention system. The sensors may determine where a particular sprinkler is located and when it was triggered. It may also determine if an area is getting hot before the sprinklers are triggered. In this fashion, important advantages in sprinkler control systems can be obtained. Such computer monitoring of sprinkler systems will provide greater safety and control.

In summary, it will be noted that the I/O Bridge device 10 of the present invention has a number of advantages, some of which have been described above and others of which are inherent in the invention. Furthermore, in the vast range of uses to which the I/O Bridge device could be put, many modifications could be made to the I/O Bridge device without departing from the teachings of the present invention. Accordingly, the appended claims are intended to cover all such modifications and alternative constructions that fall within the true scope and spirit of the invention.

What is claimed is:

1. An interface apparatus for providing communication between at least one peripheral electronic device and a personal computer (PC) having a keyboard port and a keyboard bus, said interface apparatus connected to said PC via said keyboard bus, said keyboard bus including a bidirectional data line for normally providing two-way data communication between a keyboard and said PC, said PC adapted to communicate with said keyboard via said keyboard bus using a particular keycode format based upon the coding of keyboard keystroke information as individual sequential keyboard characters, said peripheral electronic device having means for monitoring and controlling remotely-located, electrically-controlled equipment, said peripheral electronic device further having means for providing at least one device monitor signal indicative of the operational status of said equipment, said monitor signal having a signal format not directly compatible with said particular keycode format, said interface apparatus comprising:

input means for receiving said monitor signal from said peripheral electronic device, and for providing a digital input signal in response thereto;

translator means for providing a translated input data signal in response to said digital input signal, said translated input data signal having a signal format which is directly compatible with said particular keycode format such that said translated input data signal is adapted to be directly interpreted by said PC as keyboard keystroke information;

write means for transmitting said translated input data signal to said PC over said keyboard bus via said keyboard port; and read means for receiving and interpreting a return data signal transmitted by said PC over said keyboard bus via said keyboard port.

2. The interface apparatus according to claim 1, further comprising:

output means for transmitting a control signal to said peripheral electronic device in response to said return data signal transmitted by said PC over said keyboard bus.

3. The interface apparatus according to claim 1, further comprising:

means for coupling a detachable keyboard to said keyboard bus along said interface apparatus being connected at the same time to said PC via said keyboard bus, such that a data signal provided by either said keyboard or said interface apparatus can be interpreted by said PC.

4. The interface apparatus according to claim 1, wherein said digital input signal provided by said input means includes a binary-based digital signal, and wherein said translator means includes means for translating said binary-based digital signal into a text-character-based digital signal, and for translating said text-character-based digital signal into a keyboard code signal which can be directly interpreted by said PC.

5. The interface apparatus according to claim 1, wherein said peripheral electronic device includes a plurality of sensor means for providing a plurality of monitor signals to said interface apparatus, and wherein said input means includes means for multiplexing said plurality of monitor signals.

6. The interface apparatus according to claim 1, wherein said monitor signal received from said peripheral electronic device is an analog signal, and wherein said input means includes an analog-to-digital converter.

7. The interface apparatus according to claim 6, wherein said analog-to-digital converter includes a free-running linear ramp generator and three-input window comparator circuit.

8. The interface apparatus according to claim 1, wherein said monitor signal is a digital pulse signal having varying pulse widths, and wherein said input means includes means for timing the pulse widths of said monitor signal.

9. The interface apparatus according to claim 1, wherein said keyboard bus includes only four lines, and wherein one of said four lines is a bidirectional serial data bus line.

10. The interface apparatus according to claim 1, wherein said keyboard bus is compatible with an Apple Desktop Bus brand keyboard bus.

11. An apparatus for interfacing two-way data signals between a primary computer having a keyboard port and at least one peripheral electronic device, said keyboard port having a keyboard bus including a bidirectional data line for normally providing two-way data communication between a keyboard and said primary computer, said apparatus connected to said primary computer via said keyboard bus, said apparatus comprising:

means for receiving an input signal from said peripheral electronic device;

means for transmitting said keyboard code signal to said primary computer using only said keyboard bus;

means for receiving keyboard command data from said primary computer using only said keyboard bus;

means for executing said keyboard command data and for providing an output signal in response which can be interpreted by said peripheral electronic device; and means for transmitting said output signal to said peripheral electronic device.

12. The apparatus according to claim 11, wherein said input signal received from said peripheral electronic device is an analog signal, and wherein said input signal translating means includes an analog-to-digital converter.

13. The apparatus according to claim 12, wherein said analog-to-digital converter includes a free-running linear ramp generator and a three-input window comparator circuit.

14. The apparatus according to claim 12, wherein said output signal transmitted to said peripheral electronic device is an analog signal, and wherein said keyboard command data executing means includes a digital-to-analog converter.

15. The apparatus according to claim 11, wherein said input signal receiving means includes means for multiplexing a plurality of input signals.

16. The apparatus according to claim 11, wherein said input signal translating means includes means for converting said input signal into a binary-based digital signal, for translating said binary-based digital signal into a text-character-based digital signal, and for translating said text-character-based digital signal into a keyboard code signal which can be interpreted by said primary computer.

17. The apparatus according to claim 11, wherein said input signal translating means includes a microprocessor, memory, and at least one counter-timer.

18. The apparatus according to claim 11, wherein said primary computer is a personal computer having a keyboard port configuration which is compatible with a MacIntosh Plus brand keyboard bus.

19. The apparatus according to claim 11, wherein said primary computer is a personal computer having a keyboard port configuration which is compatible with an Apple Desktop Bus brand keyboard bus.

20. The apparatus according to claim 11, wherein said keyboard bus includes only four lines, and wherein one of said four lines is a bidirectional serial data bus line.

21. A peripheral data acquisition, monitor, and control device for interfacing a computer to an electrically-controlled apparatus, said computer having a central processor, a keyboard port, and a keyboard bus coupled to said keyboard port, said keyboard bus including a bidirectioal data line for normally providing two-way data communication between a keyboard and said central processor, said device comprising:
   analog input circuit means for receiving analog monitor signals from said electrically-controlled apparatus;
   analog-to-digital converter means for converting said received analog monitor signals into digital monitor signals;
   a programmable controller including a central processing unit (CPU), a random access memory, and a read only memory, said programmable controller being programmed to translate said digital monitor signals into keyboard code signals having a format acceptable by the central processor of the computer as keyboard keystroke information, and to provide digital control signals in response to keyboard command signals sent by said central processor of said computer;
   keyboard interface circuit means for providing a two-way interface between said programmable controller and said central processor over said keyboard bus;
   digital-to-analog converter means for converting said digital control signals into analog control signals; and
   analog output circuit means for transmitting said analog control signals to said electrically-controlled apparatus.

22. The apparatus according to claim 21, further comprising:
   digital input circuit means for receiving digital monitor signals from said electrically-controlled apparatus; and
   digital output circuit means for transmitting digital control signals to said electrically-controlled apparatus.

23. The apparatus according to claim 22, further comprising:
   pulse input circuit means for measuring a pulse width of variable pulse-width digital monitor signals received from said electrically-controlled apparatus; and
   pulse output circuit means for providing variable pulse-width digital control signals to said electrically-controlled apparatus.

24. The apparatus according to claim 21, wherein said electrically-controlled apparatus provides a plurality of analog monitor signals, and wherein said analog input circuit means includes means for multiplexing said plurality of analog monitor signals.

25. The apparatus according to claim 21, wherein said keyboard port and the format of said keyboard code signals are compatible with Apple brand personal computers.

26. A method of providing two-way communication between at least one peripheral electronic device and a personal computer (PC) having a keyboard port and a keyboard bus, by interfacing to said PC over said keyboard bus, said keyboard bus including a bidirectional data line for normally providing two-way data communication between a keyboard and said PC, said PC adapted to communicate with said keyboard via said keyboard bus using a particular keycode format based upon the coding of keyboard keystroke information as individual sequential keyboard characters, said peripheral electronic device having means for monitoring and controlling remotely-located, electrically-controlled equipment, said peripheral electronic device further having means for providing at least one device monitor signal indicative of the operational status of said equipment, said monitor signal having a signal format not directly compatible with said particular keycode format, said method comprising the steps of:
   (a) receiving said monitor signal from said peripheral electronic device and providing a digital input signal in response thereto;
   (b) translating said digital input signal into a translated input data signal having a signal format which is directly compatible with said particular keycode format such that said translated input data signal is adapted to be directly interpreted by said PC as keyboard keystroke information;
   (c) transmitting said translated input data signal to said PC over said keyboard bus through said keyboard port; and
   (d) receiving said interpreting a return data signal transmitted by said PC over said keyboard bus via said keyboard port.

27. The method according to claim 26, further comprising the step of:
   transmitting a control signal to said peripheral electronic device in response to said return data signal transmitted by said PC over said keyboard bus.

28. The method according to claim 26, wherein said monitor signal includes an analog signal, and wherein said monitor signal receiving step includes the step of converting said analog signal into a digital signal.

29. The method according to claim 26, wherein said monitor signal receiving step includes the step of multiplexing a plurality of monitor signals.

30. The method according to claim 26, wherein said monitor signal is a digital pulse signal having varying pulse widths, and wherein said monitor signal receiving step includes the step of timing the pulse widths of said monitor signal.

31. The method according to claim 26, wherein said digital input signal includes a binary-based digital signal, and wherein said digital input signal translating step includes the step of converting said binary-based digital signal into a decimal-based digital signal.

32. The method according to claim 31, wherein said digital input signal translating step further includes the step of converting said decimal-based digital signal into a text-character-based digital signal.

33. A method of monitoring and controlling at least one peripheral electronic device by a computer having a keyboard port, the monitoring and controlling being performed using only said keyboard port, said method comprising the steps of:
  (a) receiving an input signal from said peripheral electronic device;
  (b) translating said input signal into a keyboard code signal which emulates individual sequential keyboard character keystroke information and which is adapted to be interpreted by said computer as keyboard keystroke information;
  (c) transmitting said keyboard code signal to said computer using only said keyboard port;
  (d) receiving keyboard command data from said computer using only said keyboard port, said keyboard command data being determined by said computer in response to said keyboard code signal and provided to said keyboard port;
  (e) executing said keyboard command data and providing an output signal in response which can be interpreted by said peripheral electronic device; and
  (f) transmitting said output signal to said peripheral electronic device.

34. The method according to claim 33, wherein said input signal includes an analog signal, and wherein said input signal receiving step includes the step of converting said analog signal into a digital signal.

35. The method according to claim 33, wherein said output signal is an analog signal, and wherein said output signal transmitting step includes the step of converting said output signal into an analog signal.

36. The method according to claim 33, wherein said input signal includes a binary-based digital signal, and wherein said input signal translating step includes the step of converting said binary-based digital signal into a text-character-based digital signal.

37. The method according to claim 33, wherein said keyboard code signal transmitting step and said keyboard command data receiving step both include the step of writing to and reading from a specified data register, respectively.

38. The method according to claim 33, wherein said keyboard command data executing step includes a step of determining whether said keyboard command data includes a command request to output data, a function request to input data, or a procedure request to perform a predefined series of tasks.

* * * * *